(12) United States Patent
Kaise

(10) Patent No.: US 8,488,075 B2
(45) Date of Patent: Jul. 16, 2013

(54) ACTIVE MATRIX SUBSTRATE, DISPLAY PANEL, DISPLAY DEVICE, AND ELECTRONIC APPARATUS

(75) Inventor: Yasuyoshi Kaise, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 249 days.

(21) Appl. No.: 12/998,046

(22) PCT Filed: Jun. 19, 2009

(86) PCT No.: PCT/JP2009/061232
§ 371 (c)(1),
(2), (4) Date: Mar. 11, 2011

(87) PCT Pub. No.: WO2010/103676
PCT Pub. Date: Sep. 16, 2010

(65) Prior Publication Data
US 2011/0170028 A1    Jul. 14, 2011

(30) Foreign Application Priority Data
Oct. 15, 2008   (JP) .................................. 2008-266497

(51) Int. Cl.
*G02F 1/1343* (2006.01)
*G02F 1/133* (2006.01)

(52) U.S. Cl.
USPC ............................................ 349/38; 349/33

(58) Field of Classification Search
USPC .......................................................... 349/38
See application file for complete search history.

(56) References Cited

U.S. PATENT DOCUMENTS

| 6,256,004 | B1 | 7/2001 | Izumi et al. |
| 7,982,219 | B2* | 7/2011 | Kuo et al. ........................ 257/59 |
| 8,044,905 | B2* | 10/2011 | Kasahara ........................ 345/92 |
| 2002/0074580 | A1 | 6/2002 | Anzai et al. |
| 2002/0075254 | A1 | 6/2002 | Anzai |
| 2002/0084746 | A1 | 7/2002 | Anzai |
| 2002/0101394 | A1 | 8/2002 | Anzai |
| 2002/0180902 | A1 | 12/2002 | Izumi et al. |
| 2004/0164303 | A1 | 8/2004 | Anzai |
| 2007/0057257 | A1 | 3/2007 | Kim |

FOREIGN PATENT DOCUMENTS

| JP | 10186315 A | 7/1998 |
| JP | 2002175029 A | 6/2002 |
| JP | 200358080 A | 2/2003 |
| JP | 2007079568 A | 3/2007 |

OTHER PUBLICATIONS

English language International Search Report.

* cited by examiner

*Primary Examiner* — Rhonda Peace
(74) *Attorney, Agent, or Firm* — Harness, Dickey & Pierce

(57) ABSTRACT

The TFT substrate includes (i) gate lines and data lines which are provided in a matrix manner, (ii) a plurality of pixel electrodes each of which has a side which extends in parallel with the gate lines and a side which extends in parallel with the data lines and is shorter than the side, (iii) storage capacitor lines extending in parallel with the gate lines, and (iv) connection lines which are electrically connected to the respective pixel electrodes. In at least one embodiment, the number of the storage capacitor lines is smaller than that of the gate lines. A single one of the storage capacitor lines overlap a plurality of connection lines which are electrically connected to respective of the plurality of pixel electrodes which are arranged in a direction in parallel with the data lines. The single one of the storage capacitor lines and the plurality of connection lines overlap each other via the insulating film so as to form storage capacitor elements.

17 Claims, 12 Drawing Sheets

(a)

(b)

ACTIVE MATRIX SUBSTRATE, DISPLAY PANEL, DISPLAY DEVICE, AND ELECTRONIC APPARATUS

TECHNICAL FIELD

The present invention relates to an active matrix substrate, a display panel, a display device, and an electronic apparatus. More specifically, the present invention relates to (I) an active matrix substrate including a rectangular pixel electrode having (i) a first side which extends in parallel with gate lines and (ii) a second side which extends in parallel with data lines and is shorter than the first side and (II) a display panel, a display device, and an electronic apparatus each of which includes the active matrix substrate.

BACKGROUND ART

Liquid crystal display devices have been widely used as display devices of various kinds of electronic apparatuses such as a laptop computer, a computer screen, a television receiver, and a digital camera.

Such a liquid crystal display device includes (i) switching elements connected with respective pixel electrodes and (ii) a plurality of signal lines such as gate lines and data lines used for applying voltages to respective pixel electrodes by controlling the switching elements. The gate lines convey gate signals generated by a gate driving circuit. The data lines convey data voltages generated by a data driving circuit. Each of the switching elements causes a data voltage to be applied to a corresponding pixel electrode in response to a gate signal.

In general, such a gate driving circuit and a data driving circuit are mounted, in the forms of a plurality of integrated circuit chips, on a substrate. Such an integrated circuit chip accounts for a large proportion of manufacturing costs of the liquid crystal display device. In particular, a data driving integrated circuit chip has a complicated configuration and thereby being difficult to integrate. Accordingly, the data driving integrated circuit chip is relatively expensive, as compared to a gate driving circuit chip.

In these years, a liquid crystal display device has been proposed in which, in order to reduce cost of the driver by reducing the number of the gate driving circuit chips, (i) the number of gate lines is three times larger than the number defined by a resolution, (ii) the number of source lines is ⅓ of the resolution, and (iii) each of dots has a structure (RGB lateral stripe structure) which is made up of subpixels of red (R), green (G), and blue (B) each of which has a rectangular shape with an approximate aspect ratio of 1:3 (e.g., see Patent Literature 1).

FIGS. 10 and 11 are plane views each of which illustrates a schematic configuration of main parts of a liquid crystal display device disclosed in Patent Literature 1.

The liquid crystal display device disclosed in Patent Literature 1 includes gate lines 101 which extend in a horizontal direction; data lines 102 which extend in a vertical direction and are perpendicular to the gate lines 101; pixel electrodes 103 each of which has four sides including two sides in parallel with the gate lines 101 and two sides in parallel with the data lines 102; and storage electrode lines 104 as storage capacitor lines (see FIGS. 10 and 11). Each of the storage electrode lines 104 at least partially overlaps the pixel electrodes 103 so as to form storage capacitors.

Each of the storage electrode lines 104 shown in FIG. 10 includes (i) a trunk line 104a extending substantially in parallel with the data lines 102 and (ii) a plurality of storage electrodes 104b through 104e branched off from the trunk line 104a. The storage electrodes 104b through 104e (i) are provided in the vicinity of the gate lines 101, (ii) are branched off from both sides of the trunk line 104a, and (iii) extend in parallel with the gate lines 101.

Each of the storage electrode lines 104 shown in FIG. 11 is provided close to one of any adjacent two gate lines 101 and extends substantially in parallel with the gate lines 101.

In any cases shown in FIGS. 10 and 11, each of the pixel electrodes 103 of the liquid crystal display device disclosed in Patent Literature 1 has (i) two longitudinal sides 103b which extend in parallel with the data lines 102 and (ii) two lateral sides 103a which extend in parallel with the gate lines 101 and are (approximately three times) longer than the two longitudinal sides 103b.

Accordingly, the number of the pixel electrodes 103 provided on each row is smaller and instead the number of the pixel electrodes 103 provided on each column is larger, as compared to a case where the lateral side 103a of the pixel electrode 103 is shorter than the longitudinal side 103b. This allows the number of entire data lines 102 to become smaller, and therefore the number of the data driving circuit chips can be reduced for saving material costs.

CITATION LIST

[Patent Literature]
Patent Literature 1
Japanese Patent Application Publication, Tokukai, No. 2007-79568 (Publication Date: Mar. 29, 2007)

SUMMARY OF INVENTION

Technical Problem

However, a storage capacitor line is, in general, affected by a potential change of a data line via a capacitor formed at an intersection of the storage capacitor line and the data line, and accordingly a potential change occurs in the storage capacitor line. In a case where a gate of a transistor is closed before the electric potential of the storage capacitor line returns to a desired electric potential, an ultimate electric potential of the pixel electrode is changed due to an effect of the electric potential change of the storage capacitor line after the gate turns off, and thereby a crosstalk occurs. The storage electrode lines 104 of the liquid crystal display device shown in FIG. 11 have a problem that the storage electrode lines 104 are affected, due to their structures, by electric potential changes of data lines via the capacitors respectively formed at the intersections of the storage electrode lines 104 and the data lines 102, and therefore electric potential changes easily occur in the storage electrode lines 104.

The liquid crystal display device shown in FIG. 10 includes the trunk line 104a extending in parallel with the data lines 102 and the storage electrodes 104b through 104e branched off from the trunk line 104a. This causes a problem that parasitic capacitors formed by the storage electrode line 104 and adjacent data lines 102 becomes large, and therefore the electric potential of the storage electrode line 104 is changed in response to an electric potential change of a particular data line 102.

An amount of the electric potential change of the storage electrode line 104 depends on an amount of the electric potential change of the data line 102, that is, a display pattern. The following describes a case, as an example, where a proper video picture to be displayed is a pattern including a gray tone background and a black or white window disposed on the background (see (a) of FIG. 12). In the case of the configuration shown in FIG. 10 for example, when the electric potential of the storage electrode line 104 is changed as described above, a phenomenon called crosstalk (shadowing) occurs in an actually displayed video picture where a dark or bright bar appeared above and below the window is seen (see (b) of FIG. 12). This causes quality of image to be deteriorated. Moreover, in the case of the configuration shown in FIG. 11, a dark or bright bar appeared on right and left of the window is seen.

The pixel electrode of the liquid crystal display device disclosed in Patent Literature 1 has a structure in which the lateral side 103a, which extends in parallel with the gate lines 101 is longer than the longitudinal side 103b, which extends in parallel with the data lines 102. Accordingly, the storage electrode lines 104 (see FIG. 11) or the storage electrodes 104b through 104e (see FIG. 10) which are provided in parallel with the gate lines 101 shade areas which account for a large proportion of entire subpixels (i.e., a display area). This causes a problem that an aperture ratio becomes lower, as compared to a structure (RGB longitudinal stripe structure) of a pixel electrode in which a lateral side 103a extending in parallel with gate lines 101 is shorter than a longitudinal side 103b extending in parallel with data lines 102.

The present invention is accomplished in view of the problems, and its object is to provide (I) an active matrix substrate which can be used in a display device which includes rectangular pixel electrodes each of which has (i) a first side which extends in parallel with gate lines and (ii) second side which extends in parallel with data lines and is shorter than the first side and (II) a display panel, a display device, and an electronic apparatus each of which includes the active matrix substrate, with which a crosstalk occurs less than a conventional display device while storage capacitance is being secured. Moreover, a further object of the present invention is to provide (I) an active matrix substrate which can be used in a display device including rectangular pixel electrodes each of which has (i) a first side which extends in parallel with gate lines and (ii) a second side which extends in parallel with data lines and is shorter than the first side and (II) a display panel, a display device, and an electronic apparatus each of which includes the active matrix substrate, with which an aperture ratio higher than that of a conventional display device can be attained.

Solution to Problem

In order to attain the object, an active matrix substrate of the present invention includes: a plurality of gate lines and a plurality of data lines arranged in a matrix manner: a plurality of pixel electrodes each of which has a first side and a second side, the first side extending in parallel with the plurality of gate lines, the second side extending in parallel with the plurality of data lines and being shorter than the first side; a plurality of storage capacitor lines which are arranged in parallel with the plurality of gate lines; a plurality of connection lines which are electrically connected with respective of the plurality of pixel electrodes, part of each of the plurality of storage capacitor lines and part of each of the plurality of connection lines overlapping each other via an insulating film so as to form a storage capacitor element, the part of the plurality of storage capacitor lines and the part of each of the plurality of connection lines serving as respective electrodes of the storage capacitor element, the number of the plurality of storage capacitor lines being smaller than that of the plurality of gate lines, each of the plurality of storage capacitor lines overlapping some of the plurality of connection lines via the insulating film, the some of the plurality of connection lines being respectively electrically connected with corresponding ones of the plurality of pixel electrodes which are arranged along the plurality of data lines.

A display panel of the present invention includes: an active matrix substrate recited in any one of claims 1 through 11; a counter substrate which faces the active matrix substrate; and a display medium layer which is provided between the active matrix substrate and the counter substrate. Note that the display medium can be, for example, a liquid crystal layer.

A display device of the present invention includes the display panel. Moreover, an electronic apparatus of the present invention includes a display device.

According to the configurations, the number of the plurality of storage capacitor lines is smaller than that of the plurality of gate lines, and the plurality of storage capacitor lines are provided so as to extend in parallel with the plurality of gate lines. Accordingly, capacitors respectively formed at intersections of the plurality of storage capacitor lines and the plurality of data lines are reduced as compared to the conventional liquid crystal panel shown in FIG. 11. Therefore, the plurality of storage capacitor lines are hardly affected by electric potential changes of the plurality of data lines. Moreover, loads on the plurality of storage capacitor lines are reduced. Further, unlike the conventional liquid crystal panel shown in FIG. 10, the problem does not occur that an electric potential of a storage capacitor line is changed in response to an electric potential change of a particular data line, due to a parasitic capacitor formed by the storage capacitor line and an adjacent data line.

As described above, the number of the plurality of storage capacitor lines is smaller than that of the plurality of gate lines. Therefore, each of the plurality of storage capacitor lines overlaps some of the plurality of connection lines via the insulating film. With this configuration, storage capacitor elements are formed by each of the plurality of storage capacitor lines and some of the plurality of connection lines which overlaps the corresponding storage capacitor line.

Accordingly, with the use of the active matrix substrate, it is possible to obtain a display panel, a display device, and an electronic apparatus which hardly cause a crosstalk while sufficiently securing storage capacitance.

As described above, a storage capacitor line is affected by a potential change of a data line via a capacitor formed at an intersection of the storage capacitor line and the data line, and accordingly a potential change occurs in the storage capacitor line. In a case where a gate of a transistor is closed before the electric potential of the storage capacitor line returns to a desired electric potential, an ultimate electric potential of the pixel electrode is changed due to an effect of the electric potential change of the storage capacitor line after the gate turns off, and thereby a crosstalk occurs.

In order to prevent the crosstalk from occurring, measures such as follows can be taken: (1) capacitors respectively formed at intersections of storage capacitor lines and data lines are reduced so that the storage capacitor lines are hardly affected by electric potential changes of the data lines, (2) loads (capacitor, resistor) on the entire storage capacitor lines are reduced, and/or (3) driving force of an input signal source which drives the storage capacitor lines is enhanced (note however that power consumption will be increased).

According to the configurations as described above, the crosstalk can be prevented with the effects of the measures (1) and (2) in which the capacitors formed by the plurality of storage capacitor lines and the plurality of data lines are reduced.

Moreover, according to the configuration of the active matrix substrate, the effect of the measure (2) (the loads on the entire storage capacitor lines can be reduced) can be attained, and therefore the driving force of the input signal source in the measure (3) can be further reduced. Moreover, the intersections of the plurality of storage capacitor lines and the plurality of data lines are reduced, and thereby loads on the plurality data lines can be reduced. Accordingly, in addition to the foregoing effects, the configurations have an advantageous feature that the display device with small power consumption can be obtained.

Moreover, since the first side is longer than the second side in the configuration, a short circuit does not occur between the connection lines which are adjacent to each other, even though the number of the plurality of storage capacitor lines is smaller than that of the plurality of gate lines as described above.

According to the configurations, the number of the plurality of storage capacitor lines is smaller than that of the plurality of gate lines. Accordingly, it is possible to prevent a reduction of an aperture ratio due to the storage capacitor line, in the display device which includes the rectangular pixel electrodes each of which has the first side extending in parallel with the plurality of gate lines and the second side which extends in parallel with the plurality of data lines and is shorter than the first side. Therefore, the configurations make it possible to obtain the display device having a high transmittance and excellent visibility.

It is preferable that each of the plurality of gate lines is provided between the plurality of pixel electrodes; and the plurality of storage capacitor lines and the plurality of pixel electrodes overlap each other via the insulating film.

The number of the plurality of storage capacitor lines is smaller than that of the plurality of gate lines. Therefore, with the configuration, it is possible to reduce an area occupied by lines, which are provided so as to extend in parallel with the first side, in the display area of the display device including the plurality of rectangular pixel electrodes each of which has the first side extending in parallel with the plurality of gate lines and the second side which extends in parallel with the plurality of data lines and is shorter than the first side.

According to the active matrix substrate, it is preferable that a single one of the plurality of storage capacitor lines is provided per pixel which is a minimum constituent unit required for carrying out a color display with a display panel provided with the active matrix substrate.

The recitation "a single one of the plurality of storage capacitor lines is provided per pixel which is a minimum constituent unit required for carrying out a color display with a display panel provided with the active matrix substrate" means that the active matrix substrate is prepared so that the above described configuration can be attained ultimately. Therefore, the recitation does not mean that the display panel is actually prepared by sticking the active matrix substrate and a counter substrate together.

That is, in the configuration a single one of the plurality of storage capacitor lines is provided, in the active matrix substrate, per pixel which is the minimum constituent unit. Color filters used for carrying out a color display with the pixel which is the minimum constituent unit can be provided on the active matrix substrate. Alternatively, the color filters can be provided on a counter substrate which is to be attached to the active matrix substrate so as to provide a display panel. In any cases, it is sufficient as long as a single one of the plurality of storage capacitor lines is provided per "pixel which is a minimum constituent unit required for carrying out a color display with a display panel provided with the active matrix substrate".

According to the configuration, it is possible to cause aperture ratios of respective pixels each of which is the minimum constituent unit to be uniform without causing pitches of repetitive pixels to be uneven. Accordingly, it is possible to obtain the display panel and the display device having uniform display quality with the use of the active matrix substrate.

According to the active matrix substrate, it is preferable that each of the plurality of storage capacitor lines is at least partially disposed in a subpixel of a particular display color for carrying out a color display with a display panel provided with the active matrix substrate.

The configuration also indicates that the active matrix substrate is prepared so that the configuration can be attained ultimately. Accordingly, the recitation does not mean that the display panel is actually prepared by sticking the active matrix substrate and a counter substrate together. That is, the configuration indicates that the plurality of storage capacitor lines are provided so that each of the plurality of storage capacitor lines is at least partially disposed in the subpixel. Note that, in this case also, color filters used for carrying out a color display can be provided either on the active matrix substrate or on a counter substrate which is to be attached to the active matrix substrate so as to provide a display panel.

The configuration makes it possible to obtain the display device which has excellent display quality without color unevenness.

It is preferable that each of the plurality of storage capacitor lines is at least partially disposed in a blue subpixel.

Blue is a color whose visibility (intensity of perceivable brightness for each wavelength) for human is relatively small. Therefore, it is possible to suppress decrease of effective luminance to the minimum when each of the plurality of storage capacitor lines, which is to shade light, is at least partially disposed in a blue subpixel.

It is preferable that the plurality of storage capacitor lines are disposed on a layer on which the plurality of gate lines are disposed.

According to the configuration, the plurality of storage capacitor lines and the plurality of gate lines can be prepared by a single process, and therefore the number of processes can be reduced. Moreover, according to the configuration, a gate insulating film which covers the plurality of gate lines can be used as the insulating film, that is, as a dielectric substance (capacitor insulating film) which forms a storage capacitor.

It is preferable that one of the electrodes included in the storage capacitor element is disposed at least partially on a layer on which a semiconductor layer of each of a plurality of transistors is disposed, the plurality of transistors being provided for respective of the plurality of pixel electrodes.

According to the configuration, the storage capacitors can be prepared efficiently without increasing processes. Moreover, it is possible to obtain the display device which has a high aperture ratio and excellent visibility.

It is preferable that the plurality of connection lines are electrically connected with respective drain electrodes of the plurality of transistors which are provided for respective of the plurality of pixel electrodes arranged along the plurality of data lines; and a wiring between each of the drain electrodes and the storage capacitor element is at least partially disposed on a layer on which the semiconductor layer is disposed. Moreover, it is preferable that part of the wiring between each of the drain electrodes and the storage capacitor element which part overlaps a corresponding one of the plurality of gate lines is made up of a semiconductor layer in which an impurity is introduced.

According to any of the configurations, wiring resistance of the drain electrodes is reduced and a charging property is stabled. This makes it possible to obtain the display device which has excellent display quality without luminous unevenness.

It is preferable that the plurality of storage capacitor lines have a branch line in addition to a main line, the main line extending in parallel with the plurality of gate lines, and the branch line branching off from the main line and extending in parallel with the plurality of data lines. Moreover, it is preferable that the active matrix substrate further includes another plurality of storage capacitor lines arranged in parallel with the plurality of data lines, the plurality of storage capacitor lines and the another plurality of storage capacitor lines being arranged in a matrix manner.

According to any of the configurations, it is possible to shorten a length of wiring between each of the drain electrodes and a corresponding storage capacitor line. This makes it possible to provide the liquid crystal display device having a higher transmittance and excellent visibility. Moreover, resistance of the storage capacitor lines is drastically reduced, and therefore effects of electric potential changes of the plurality of data lines can be further reduced. Consequently, it is possible to provide the liquid crystal display device which hardly causes a crosstalk and has excellent display quality.

Advantageous Effects of Invention

According to the active matrix substrate, the display panel, the display device, and the electronic apparatus of the present invention, the number of the plurality of storage capacitor lines is smaller than that of the plurality of gate lines, and the plurality of storage capacitor lines are provided so as to extend in parallel with the plurality of gate lines, as described above. Accordingly, capacitors respectively formed at intersections of the plurality of storage capacitor lines and the plurality of data lines are reduced, and the plurality of storage capacitor lines are hardly affected by electric potential changes of the plurality of data lines. Moreover, loads on the plurality of storage capacitor lines are reduced, and the problem does not occur that an electric potential of a storage capacitor line is changed in response to an electric potential change of a particular data line, due to parasitic capacitor formed by the storage capacitor line and an adjacent data line. This makes it possible to prevent a crosstalk.

Moreover, the number of the plurality of storage capacitor lines is smaller than that of the plurality of gate lines, and accordingly each of the plurality of storage capacitor lines overlaps some of the plurality of connection lines via the insulating film. Each of the plurality of storage capacitor lines and some of the plurality of connection lines which overlap each other form storage capacitor elements.

Accordingly, the use of the active matrix substrate makes it possible to obtain the display panel, the display device, and the electronic apparatus display device which causes, while securing sufficient storage capacitance, a crosstalk less than a conventional display panel or a display device which includes rectangular pixel electrodes each of which has a first side extending in parallel with gate lines and a second side which extends in parallel with data lines and is shorter than the first side.

Moreover, according to the present invention, the loads on the entire storage capacitor lines can be reduced, and therefore the driving force of the input signal source can be further reduced. Moreover, the intersections of the storage capacitor lines and the data lines are reduced, and thereby the loads on the data lines can be reduced. Accordingly, the present invention can bring about an effect of obtaining the display device with small power consumption, in addition to the foregoing effects.

Even though the number of the plurality of storage capacitor lines is smaller than that of the plurality of gate lines in the present invention as described above, short circuit does not occur between adjacent two of the connection lines because each of the electrodes has the second side which extends in parallel with the data lines and is shorter than the first side which extends in parallel with the gate lines.

According to the present invention, it is possible to prevent the aperture ratio from being decreased due to the storage capacitor lines in the display device, which includes rectangular pixel electrodes each of which has the first side extending in parallel with the gate lines and the second side which extends in parallel with the data lines and is shorter than the first side, because the number of the plurality of storage capacitor lines is smaller than that of the plurality of gate lines as described above. Accordingly, it is possible to obtain the display device and the electronic apparatus each of which has a high transmittance and excellent visibility.

DESCRIPTION OF EMBODIMENTS

The following describes details of embodiments of the present invention.

Embodiment 1

Figure 1:
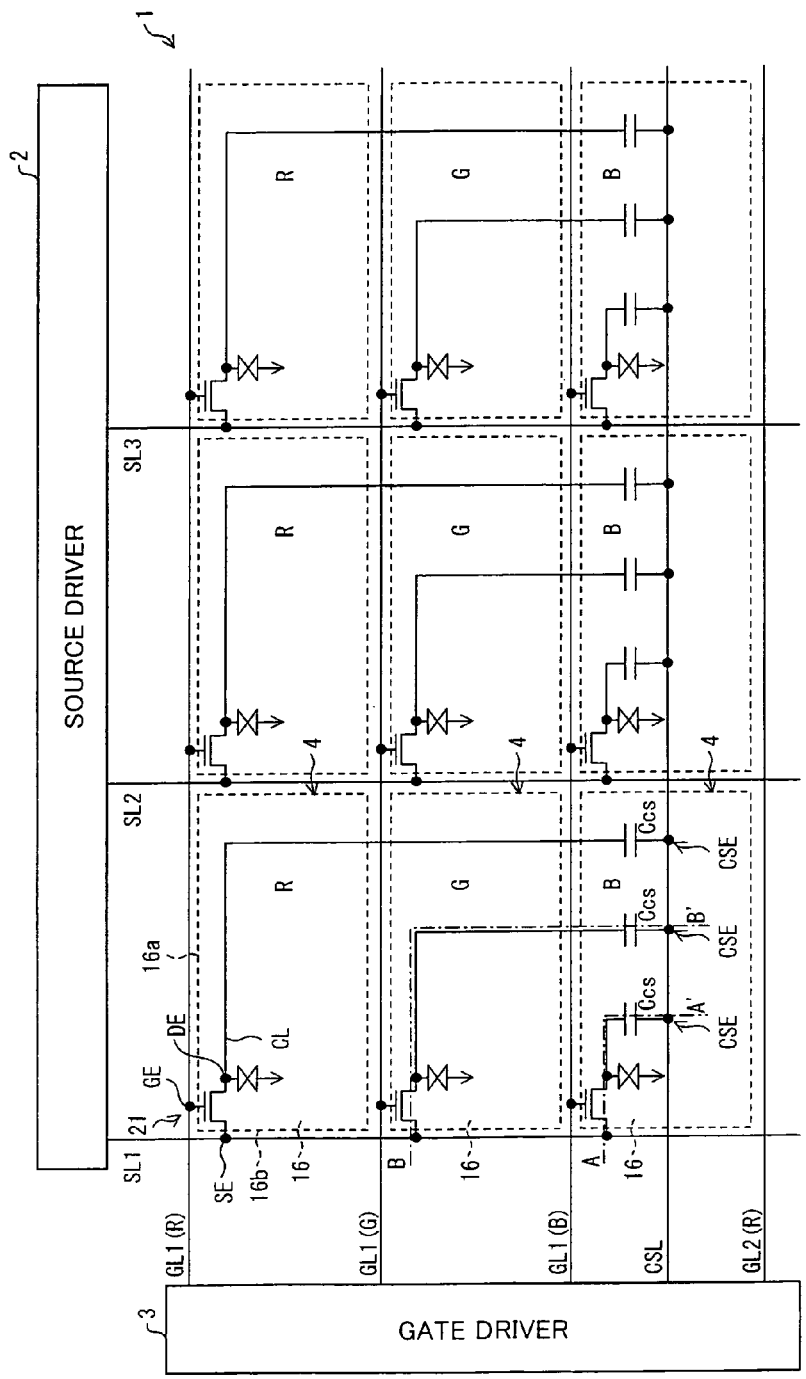
FIG. 1 is an equivalent circuit diagram of a liquid crystal panel included in a liquid crystal display device in Embodiment 1 of the present invention.
Figure 2:
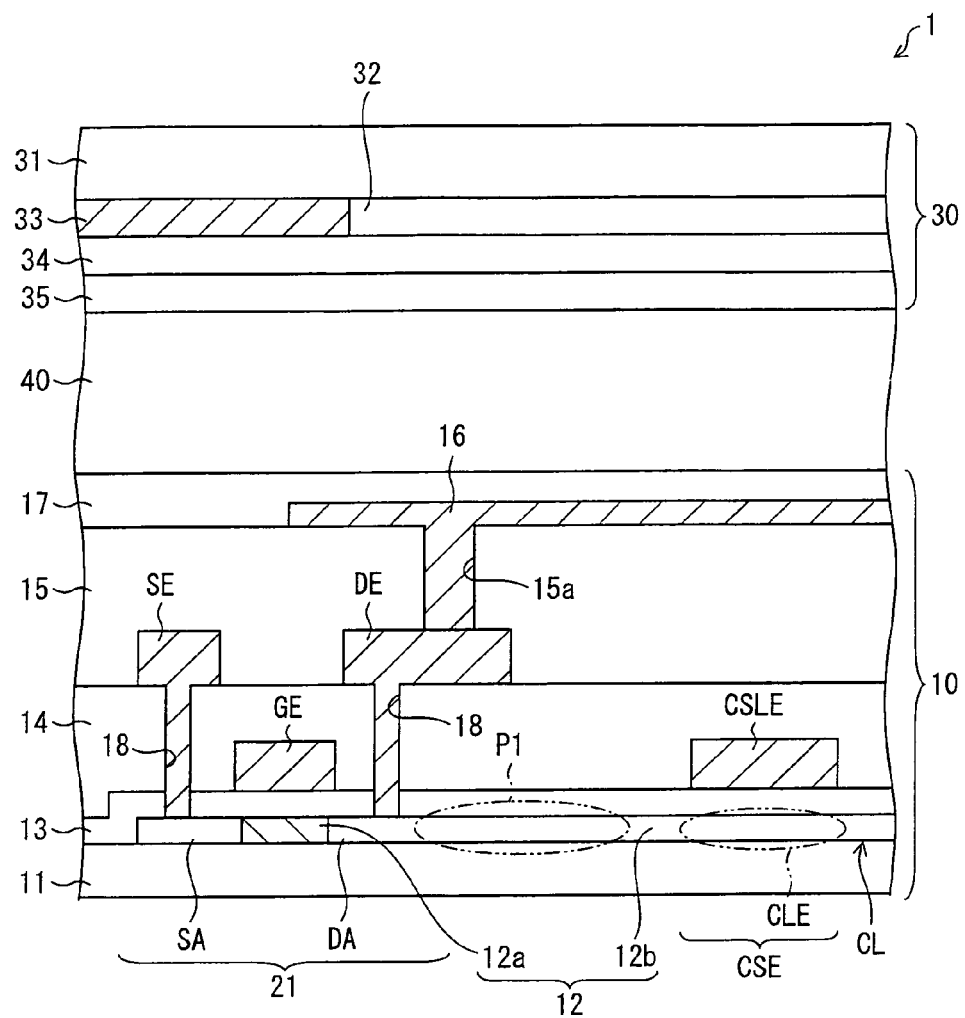
FIG. 2 is a cross-sectional view, which is taken by the line A-A' of FIG. 1, schematically illustrating main parts of the liquid crystal panel shown in FIG. 1.
Figure 3:
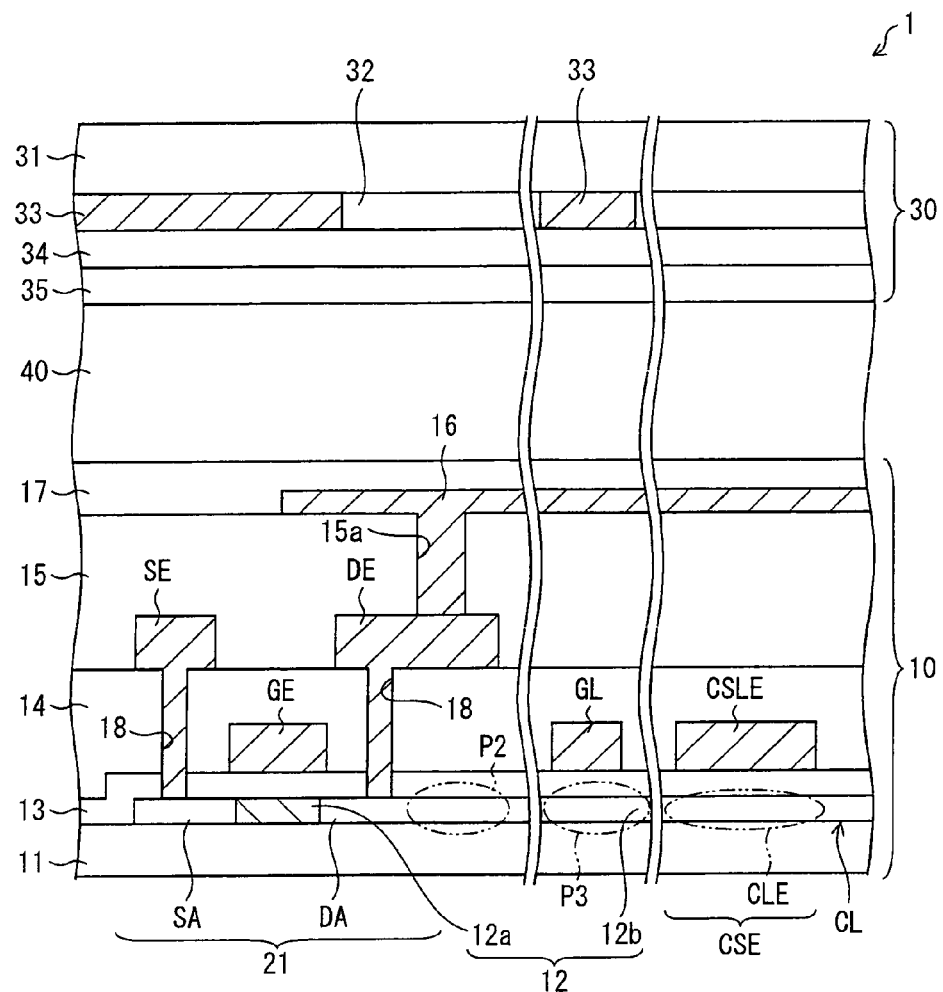
FIG. 3 is a cross-sectional view, which is taken by the line B-B' of FIG. 1, schematically illustrating main parts of the liquid crystal panel shown in FIG. 1.

The following describes an embodiment of the present invention, with reference to FIGS. 1 through 3.

FIG. 1 is an equivalent circuit diagram of a liquid crystal panel included in a liquid crystal display device of the present embodiment.

For convenience of explanation, it is assumed that a direction in which gate lines extend is regarded as a row direction in the following descriptions. Note however that, the gate lines can extend either in a lateral direction or in a longitudinal direction when a liquid crystal display device including (i) a liquid crystal panel of the present embodiment or (ii) an active matrix substrate of the present embodiment included in the liquid crystal panel is actually used.

According to the present embodiment, the active matrix substrate is provided as a lower substrate (i.e., a substrate provided on backside) and a counter substrate is provided as an upper substrate (i.e., a substrate provided on viewer side). However, the present embodiment is not limited to this. Moreover, according to the present embodiment, the active matrix substrate is exemplified by a TFT substrate including a switching element (transistor) made up of a TFT (thin film transistor). However, the present embodiment is not limited to this.

The liquid crystal display device includes an active matrix type liquid crystal panel 1 (display panel) and driving circuits such as a source driver 2 (data line driving circuit) and a gate driver 3 (gate line driving circuit) which are provided on the periphery of a display area in the liquid crystal panel 1 (see FIG. 1).

As shown in FIG. 1, the liquid crystal panel 1 of the present embodiment includes (i) data lines SL1 through SLv (v is an arbitrary integer of 2 or more; hereinafter, an arbitrary data line is referred to as "data line SL") which are provided so as to extend in a column direction (a vertical direction in FIG. 1), (ii) gate lines GL1(R), GL1(G), and GL1(B) through GLw(R), GLw(G), and GLw(B) (w is an arbitrary integer of 2 or more; hereinafter, an arbitrary gate line is referred to as "gate line GL"), and (iii) storage capacitor lines CSL each of which forms a storage capacitor Ccs.

The data lines SL and the gate lines GL are provided so as to intersect with each other in a matrix manner. According to the liquid crystal panel 1, each of the data lines SL and the gate lines GL is provided between any adjacent two subpixels 4 each of which is defined by a pixel electrode 16.

That is, according to the present embodiment, each of areas demarcated by the data lines SL and the gate lines GL serves as a single subpixel (dot), and the liquid crystal panel 1 includes the subpixels 4 which constitute respective dots and are arranged in a matrix manner. The data lines SL are driven by the source driver, and the gate lines GL are driven by the gate driver.

The storage capacitor lines CSL are provided so as to extend in the row direction. Each of the storage capacitor lines CSL is provided between adjacent two gate lines GL so as to extend in parallel with the gate lines GL. Note that, in the example shown in FIG. 1, a storage capacitor line CSL is provided between the gate line GL1(B) and the gate line GL2(R).

The subpixels 4 are provided with the pixel electrodes 16, respectively (see FIG. 1). TFTs 21 as switching elements (active elements) are respectively provided at intersections of the data lines SL and the gate lines GL. Each of the TFTs 21 has (i) a source electrode SE which is connected with the data line SL, (ii) a gate electrode GE which is connected with the gate line GL, and (iii) a drain electrode DE which is connected with the pixel electrode 16.

The gate electrode GE of each of the TFTs 21 is made up of part of the gate line GL. Moreover, the source electrode SE of each of the TFTs 21 is made up of part of the data line SL. That is, the gate electrode GE is formed on a layer on which the gate line GL is provided, and the source electrode SE is formed on a layer on which the data line SL is provided.

The pixel electrode 16 is connected with the data line SL via the TFT 21 which is connected with the gate line GL. A liquid crystal capacitor is defined by the pixel electrode 16, a counter electrode provided on a counter substrate (not illustrated), and a liquid crystal layer (a display medium layer; not illustrated) which is provided between the pixel electrode 16 and the counter electrode.

The pixel electrode 16 has a rectangular shape having a side 16a (first side) which extends in parallel with the gate line GL and a side 16b (second side) which extends in parallel with the data line SL and is shorter than the side 16a.

According to the liquid crystal panel 1, a single data line SL, a single gate line GL, and a single pixel electrode 16 are provided for each subpixel 4, and a single storage capacitor line CSL is provided for every three subpixels 4. That is, in the liquid crystal panel 1, the number of the storage capacitor lines CSL is ⅓ of the number of the gate lines GL.

Each of the subpixels 4 is provided with any one of color filters (not illustrated) of red (R), green (G), and blue (B) for each of the pixel electrodes 16.

Hereinafter, subpixels which are respectively provided with the red color filter, the green color filter, and the blue color filter are referred to as a red (R) subpixel, green (G) subpixel, and blue (B) subpixel, respectively. According to the present embodiment, subpixels 4 which have respectively different colors are provided in parallel with the data lines SL (in the column direction) (see FIG. 1).

Three (R, G, and B) subpixels 4 which are provided in the direction in parallel with the data lines SL constitute a subpixel group. The subpixel group serves as a pixel which is a minimum constituent unit (pixel for three primary colors) required for carrying out a color display. Hereinafter, the combination of the three (R, G, and B) subpixels 4 which are adjacently provided is referred to as a unit of pixel. That is, a single subpixel 4 constitutes a dot which is a basic unit for displaying video, and a single pixel is made up of three (R, G, and B) subpixels 4 (dots).

According to the liquid crystal panel 1, the storage capacitor line CSL is provided in the blue subpixel 4. Blue is a color whose visibility (intensity of perceivable brightness for each wavelength) for human is relatively small. Therefore, it is possible to suppress decrease of effective luminance to the minimum when the storage capacitor line CSL, which is to shade light, is disposed in the blue subpixel 4.

The three (R, G, and B) subpixels 4 aligned in parallel with the data lines SL are provided with respective three TFTs 21. Drain electrodes DE of the respective three TFTs 21 are electrically connected with respective three connection lines CL (extraction lines). The three connection lines CL and the single storage capacitor line CSL disposed in the blue subpixel 4 form storage capacitors Ccs in a subpixel 4 (the blue subpixel 4) (see FIG. 1).

The following describes a cross-sectional structure of the liquid crystal panel 1.

FIG. 2 is a cross-sectional view schematically illustrating a configuration of the liquid crystal panel 1 which is cut along the line A-A' of FIG. 1. FIG. 3 is a cross-sectional view schematically illustrating a configuration, which is partially omitted, of the liquid crystal panel 1 which is cut along the line B-B' of FIG. 1.

Note that FIG. 2 schematically illustrates a configuration of the blue subpixel 4 which has a TFT 21 connected with the data line SL1 and the gate line GL1(B).

The liquid crystal panel 1 includes a TFT substrate 10 and a counter substrate 30 which are provided so as to face each other. Further, a liquid crystal layer 40 is provided between the pair of substrates (see FIGS. 2 and 3). The pair of substrates are provided with phase plates and polarizing plates (not illustrated), as appropriate, on their outer sides (i.e., sides opposite to the facing sides of the respective substrates). Note that the polarizing plates provided on both outer sides of the pair of substrates are arranged in a crossed Nicols manner.

The counter substrate 30 which is used in the present embodiment is a so-called color filter substrate which includes a transparent substrate 31 made of a material such as glass. On a surface of the counter substrate 30 which surface faces the TFT substrate 10, color filters 32 of any of the colors, a black matrix 33, a counter electrode 34 (common electrode), and an alignment film 35 are provided in this order from the transparent substrate 31 side.

The color filters 32 are provided so as to respectively face the pixel electrodes 16 which are provided on the TFT substrate 10. The color filters 32 encompass three types of red, green, and blue as described above. Each of the color filters 32 having any one of the colors is provided for each of the subpixels 4 (see FIG. 1). The black matrix 33 is provided in gaps between any adjacent two color filters 32 which have respectively different colors.

The counter electrode 34 is provided so as to cover substantially entire face of the transparent substrate 31 and serves as an electrode (common electrode) which is common to the subpixels 4 (see FIGS. 2 and 3). An electric field is impressed to the liquid crystal layer 40 in response to a voltage applied to the counter electrode 34 and the pixel electrode 16, and thereby an image is formed.

The pixel electrode 16 and the counter electrode 34 are transparent electrodes each of which is made up of a transparent conducting layer made of a material such as ITO (indium tin oxide).

Note that the counter substrate 30 can be provided with a functional layer(s) (not illustrated) such as an undercoating layer and/or an overcoating layer (planarizing layer), as appropriate.

On the other hand, the TFT substrate 10 includes a transparent substrate 11, made of a material such as glass, on which (i) a semiconductor layer 12, (ii) a gate insulating film 13, (iii) a first metal electrode layer including members such as the gate lines GL and the storage capacitor lines CSL shown in FIG. 1, (iv) a first interlayer insulating film 14, (v) a second metal electrode layer including members such as the data lines SL and the drain electrodes DE shown in FIG. 1, (vi) a second interlayer insulating film 15, (vii) a pixel electrode 16, and (viii) an alignment film 17 are provided in this order. Note that, with regard to FIGS. 2 and 3, the gate electrode GE, the gate line GL (see FIG. 3), and an electrode CSLE constitute part of the first metal electrode layer, and the source electrode SE and the drain electrode DE constitute part of the second metal electrode layer. Note that the electrode CSLE is made up of a part of the storage capacitor line CSL.

Each of the TFTs 21 provided on the TFT substrate 10 has a so-called top-gate structure (planar structure) in which the semiconductor layer 12 (channel area 12a), the gate insulating film 13, the gate electrode GE, the first interlayer insulating film 14, the source electrode SE, and the drain electrode DE are provided, in this order, on the transparent substrate 11. Note that the TFT substrate 10 also can be provided with a functional layer (not illustrated) such as an undercoating layer as appropriate.

The semiconductor layer 12 has (i) a channel area 12a made up of an intrinsic semiconductor in which no impurity is introduced and (ii) an impurity-introduced area 12b made up of an extrinsic semiconductor (a P-type semiconductor or an N-type semiconductor) in which an impurity is introduced. The channel area 12a is provided below the gate electrode GE as described above. The impurity is introduced in an area of the semiconductor layer 12 except for the channel area 12a. This causes the semiconductor layer 12 to have a source area SA and a drain area DA, made up of the semiconductor layer 12 (the impurity-introduced area 12b) in which the impurity is introduced, are formed in areas adjacent to the channel area 12a.

As shown in FIG. 2, the drain area DA (impurity-introduced area 12b) is disposed below the storage capacitor line CSL (indicated by "electrode CSLE" in FIG. 2). This allows a wiring section to be formed, as the connection line CL which is electrically connected with the drain electrode DE, between the drain electrode DE and the storage capacitor line CSL. The wiring section is made up of the semiconductor layer 12 (the drain area DA, the impurity-introduced area 12b) in which the impurity is introduced.

The source area SA and the drain area DA in the semiconductor layer 12 are connected with the source electrode SE and the drain electrode DE, respectively, via contact holes 18 which are respectively formed in the gate insulating film 13 and the first interlayer insulating film 14 which cover the semiconductor layer 12.

The drain electrode DE is electrically connected with the pixel electrode 16 via a contact hole 15a formed in the second interlayer insulating film 15 which covers the data line SL and the gate line GL. This allows the connection line CL to be electrically connected with the pixel electrode 16 via the drain electrode DE.

Accordingly, an area of the connection line CL which area overlaps the storage capacitor line CSL has a pixel electrode electric potential and thereby serves as an electrode CLE (lower capacitor electrode) which is one of electrodes constituting the storage capacitor Ccs. Moreover, an area of the storage capacitor line CSL which area overlaps the connection line CL serves as an electrode CSLE (upper capacitor electrode) which is the other of electrodes constituting the storage capacitor Ccs.

According to the liquid crystal panel 1 shown in FIGS. 2 and 3, the storage capacitor line CSL is provided on a layer on which the gate electrode GE (i.e., the gate line GL) is provided. Accordingly, the gate insulating film 13 covering the gate line GL serves as a dielectric substance (capacitor insulating film) which is provided between the storage capacitor line CSL and the connection line CL so as to form the storage capacitor Ccs.

That is, the gate insulating film 13 is provided between the electrode CLE and the electrode CLE so as to form a storage capacitor element CSE which defines the storage capacitor Ccs.

The storage capacitor line CSL is provided on the layer on which the gate line GL is provided (see FIGS. 2 and 3), and thereby the storage capacitor line CSL and the gate line GL can be prepared by a single process. This makes it possible to reduce the number of processes.

According to the liquid crystal panel 1, at least part of the electrode CLE (connection line CL) which is one of electrodes constituting the storage capacitor Ccs is disposed on a layer on which the semiconductor layer 12 (channel area 12a) constituting the TFT 21 is disposed (see FIGS. 2 and 3). This makes it possible to (i) prepare the storage capacitor Ccs efficiently while the number of processes are not increased and (ii) obtain the liquid crystal display device which has a high aperture ratio and excellent visibility.

At least part of wiring (connection line CL) between the drain electrode DE and the storage capacitor element CSE (i.e., the area in which the electrode CLE and the electrode CSLE overlap each other so as to form the storage capacitor Ccs) is disposed on the layer on which the semiconductor layer 12 (channel area 12a) which forms the TFT 21 is disposed (see an area P1 indicated by a two-dot chain line in FIG. 2 or an area P2 and/or an area P3 which are indicated by two-dot chain lines in FIG. 3). This allows wiring resistance of the drain electrode DE to be reduced, and thereby a charging property is stabilized. Consequently, it is possible to obtain the liquid crystal display device which has excellent display quality without luminous unevenness.

The area of the wiring (connection line CL) which (i) is between the drain electrode DE and the storage capacitor element CSE and (ii) overlaps the gate line GL is made up of the semiconductor layer 12 in which the impurity is introduced as described above (see the area P3 indicated by the two-dot chain line in FIG. 3). This makes it possible to prevent the area, which overlaps the gate line GL, from serving as a parasitic transistor.

The following describes a method for producing the TFT substrate 10.

According to the present embodiment, as described above, the lower electrode (electrode CLE) of the storage capacitor element CSE is formed in the connection line CL which is made up of the semiconductor layer 12 in which the impurity is introduced. For this configuration, the following method is employed.

First, with a method such as CVD (chemical vapor deposition), a silicon dioxide film is provided, as a base coating (not illustrated), on the transparent substrate 11 which is made of a material such as glass.

Then, an amorphous silicon layer is provided on the base coating with a method such as plasma CVD or decompression CVD. Subsequently, the amorphous silicon layer (i) is caused to have a polycrystalline property with a method such as laser-annealing so as to obtain a polysilicon film and then (ii) is patterned so as to form the semiconductor layer 12.

Note that the semiconductor layer 12 can be formed by depositing the polysilicon film with decompression CVD. In such a case, it is possible that the polysilicon film (i) is caused to have an amorphous property by ion-implanting silicon atoms as appropriate, and then (ii) is heat-treated so as to cause the polysilicon film to have a polycrystalline property. Further, it is possible that the amorphous silicon film or the polysilicon film is laser-annealed so as to improve its crystalline property.

Then, a resist is applied to the semiconductor layer 12 so as to cover an area which is to serve as the channel area 12a, and impurity ions of an element such as phosphorous are selectively implanted in the semiconductor layer 12 while the resist is serving as a mask. If needed, a treatment such as activation annealing is carried out with respect to the semiconductor layer 12. This is how the channel area 12a, the source area SA, and the drain area DA are formed in the semiconductor layer 12.

Then, with a method such as decompression CVD, a silicon dioxide film called HTO (high temperature oxide) film is provided on the transparent substrate 11 on which the semiconductor layer 12 is provided, and thereby the gate insulating film 13 is formed as shown in FIGS. 2 and 3.

Then, the first metal electrode layer including the gate line GL, the gate electrode GE, and the storage capacitor line CSL, etc. is formed (see FIG. 2 or 3) by stacking materials such as tantalum and tungsten with a method such as sputtering and patterning thus stacked materials. This is how the gate line GL, the gate electrode GE, and the storage capacitor line CSL are formed with a single process.

Then, a silicon dioxide film is provided on the transparent substrate 11, on which the first metal electrode layer has been provided, so as to form the first interlayer insulating film 14 with a method such as plasma CVD. After that, the gate insulating film 13 and the first interlayer insulating film 14 are etched at respective parts thereof so that the contact holes 18 are formed in the parts.

Then, a material such as aluminum is stacked with a method such as sputtering and thus stacked material is patterned so as to form (i) the second metal electrode layer including the data line SL, the source electrode SE, and the drain electrode DE, etc. and (ii) contact sections in the contact holes 18. This allows the source electrode SE and the drain electrode DE to be connected with the source area SA and the drain area DA, respectively, via the contact holes 18.

Then, with a method such as plasma CVD, a silicon dioxide film is provided on the transparent substrate 11, on which the second metal electrode layer has been provided, so as to form the second interlayer insulating film 15. After that, the second interlayer insulating film 15 is etched at a part thereof so that the contact hole 15a is formed in the part.

Subsequently, an ITO (indium tin oxide) film (i) is provided on the second interlayer insulating film 15, and then (ii) is patterned so as to form the pixel electrode 16. This allows the pixel electrode 16 to be connected with the drain electrode DE via the contact hole 15a.

Then, a thin film made of an alignment film material such as a polyimide resin is formed with a method such as printing. After that, a surface of the thin film is subjected to an alignment treatment with a method such as rubbing so as to form the alignment film 17. This is how the TFT substrate 10 is produced.

The present embodiment is exemplified by the case where the gate line GL, the gate electrode GE, and the storage capacitor line CSL are formed in the single process. However, the present invention is not limited to this. For example, the gate line GL, the gate electrode GE, and the storage capacitor line CSL can be formed with a method described below.

First, the semiconductor layer 12 is patterned and a gate insulating film 13 is provided on thus patterned semiconductor layer 12. After that, materials such as tantalum and tungsten are stacked on the gate insulating film 13 with a method such as sputtering and thus stacked materials are patterned so as to form the gate line GL and the gate electrode GE. Then, impurity ions are selectively implanted in the semiconductor layer 12 while the gate electrode GE is serving as a mask. After that, materials such as tantalum and tungsten are stacked with a method such as sputtering and thus stacked materials are patterned while the gate line GL and the gate electrode GE are being masked. This allows the storage capacitor line CSL to be provided on the semiconductor layer 12 in which the impurity is introduced. Note that, in this case, the gate line GL and the storage capacitor line CSL can be formed with the use of respectively different materials.

The liquid crystal panel 1 of the present embodiment can be produced by putting the TFT substrate 10, which is thus produced, together with the counter substrate 30 with the use of a conventional method. The liquid crystal panel 1 can be produced through, for example, processes in which (i) a sealing section made of a sealing material such as a thermosetting resin or an ultraviolet curing resin is provided on the TFT substrate 10 with a method such as printing, (ii) the counter substrate 30 is attached to the TFT substrate 10, and after that (iii) a liquid crystal material is introduced and sealed between the substrates with decompression so as to form the liquid crystal layer 40. Alternatively, the liquid crystal layer 40 can be produced through processes in which (i) a sealing section is provided on the TFT substrate 10, (ii) liquid crystal is introduced in the sealing section with an instillation method, and after that (iii) the counter substrate 30 is attached to the TFT substrate 10.

The counter substrate 30 can be a counter substrate in common use. A configuration and a production method of the counter substrate are not limited in particular.

The counter substrate 30 can be produced with a conventional production method. For example, a black matrix 33 is patterned on a transparent substrate 31 made of a material such as glass, and then colored layers of red, green, and blue are patterned in gaps in the pattern of the black matrix 33 so as to form color filters 32. As appropriate, an over-coating layer (not illustrated) is provided with the use of a material such as acrylic resin. Then, an ITO film is provided so as to cover a whole face of the transparent substrate 31 so as to form a counter electrode 34. Subsequently, a thin film made of an alignment film material such as polyimide resin is formed with a method such as printing. After that, a surface of the thin film is subjected to an alignment treatment with a method such as rubbing so as to form an alignment film 35. This is how the counter substrate 30 is formed.

As described above, according to the present embodiment, the number of the storage capacitor lines CSL is smaller than that of the gate lines GL, and the storage capacitor lines CSL are provided so as to extend in parallel with the gate lines GL. Accordingly, capacitors respectively formed at intersections of the storage capacitor lines CSL and the data lines SL are reduced and therefore the storage capacitor lines CSL are hardly affected by electric potential changes of the data lines SL. Moreover, loads on the storage capacitor lines are reduced as compared to a conventional technique. Further, unlike a conventional technique, the liquid crystal panel 1 does not have the problem that an electric potential of a storage capacitor line is changed in response to an electric potential change of a particular data line, due to a parasitic capacitor formed by the storage capacitor line and an adjacent data line.

According to the present embodiment, the use of the TFT substrate 10 makes it possible to obtain the liquid crystal display device in which a crosstalk hardly occurs while storage capacitance is being secured sufficiently.

In general, a storage capacitor line is affected by an electric potential change of a data line via a capacitor formed at an intersection of the storage capacitor line and the data line, and thereby an electric potential change occurs in the storage capacitor line. In a case where a gate is closed before the electric potential of the storage capacitor line is returned to a desired electric potential, an ultimate electric potential of a pixel electrode is changed due to the electric potential change of the storage capacitor line after the gate turns off, and thereby a crosstalk occurs.

In order to prevent the crosstalk from occurring, measures such as follows can be taken: (1) capacitors respectively formed at intersections of the storage capacitor lines and the data lines are reduced so that the storage capacitor lines are hardly affected by the electric potential changes of the data lines, (2) loads (capacitance, resistance) on the entire storage capacitor lines are reduced, and/or (3) driving force of an input signal source which drives the storage capacitor lines is enhanced (note however that power consumption will be increased).

According to the present embodiment, the capacitors respectively formed at intersections of the storage capacitor lines CSL and the data lines SL are reduced, and therefore the effects of the measures (1) and (2) can be obtained. Accordingly, the crosstalk can be prevented.

Moreover, according to the present embodiment, the effect of the measure (2) (the loads on the entire storage capacitor lines can be reduced) can be attained, and therefore the driving force of the input signal source in the measure (3) can be further reduced. Moreover, the intersections of the storage capacitor lines CSL and the data lines SL are reduced, and thereby the loads on the data lines SL can be reduced. Accordingly, the liquid crystal display device with small power consumption can be obtained.

Moreover, since the first side is longer than the second side in the present embodiment, a short circuit does not occur between the connection lines which are adjacent to each other, even though the number of the storage capacitor lines CSL is smaller than that of the gate lines GL as described above.

According to the present embodiment, as described above, the number of the storage capacitor lines CSL is smaller than that of the gate lines GL. Accordingly, it is possible to prevent a decrease of an aperture ratio due to the storage capacitor line, as compared to a conventional technique. Therefore, according to the present embodiment, it is possible to obtain the liquid crystal display device having a high transmittance and excellent visibility.

The present embodiment is exemplified, as described above, by the case where the data lines SL and the gate lines GL are respectively provided in gaps between any adjacent subpixels 4, and each of the storage capacitor lines CSL is provided so as to overlap a corresponding pixel electrode 16 via the insulating film (the gate insulating film 13, the first interlayer insulating film 14, and the second interlayer insulating film 15) (that is, the storage capacitor lines CSL are provided in the subpixels 4). However, the present embodiment is not limited to this. For example, it is possible that the gate lines GL are disposed in the subpixels 4 and the storage capacitor lines CSL are respectively provided in gaps between the subpixels 4.

Note that the number of the storage capacitor lines CSL is smaller than that of the gate lines GL and therefore the storage capacitor lines CSL account for a small area for each picture element. Accordingly, it is possible to increase an aperture ratio by providing (i) the gate lines GL in respective gaps between any adjacent two subpixels 4 and (ii) the storage capacitor lines CSL in the subpixels 4, as described in the present embodiment.

Moreover, the present embodiment is exemplified by the case where the storage capacitor line CSL is disposed in the blue subpixel 4 (see FIG. 1). However, the present embodiment is not limited to this.

In a case where the storage capacitor line CSL is at least partially disposed only in a subpixel 4 having a particular color (which is not limited to blue and preferably a single color), it is possible to obtain the liquid crystal display device having excellent display quality without color unevenness. Therefore, it is preferable that the storage capacitor line CSL is at least partially disposed in a predetermined subpixel 4 having a particular display color (predetermined display color). It is more preferable that the storage capacitor line CSL is at least partially disposed in a blue subpixel 4.

The present embodiment is exemplified by the case where the TFT 21 having a top-gate structure is used as a transistor as described above. However, the present embodiment is not limited to this. It is possible to use a TFT having a so-called bottom gate structure in which a semiconductor layer 12 is provided on a gate electrode GE via a gate insulating film 13. Moreover, the transistor is not limited to the TFT but can be, for example, an FET (field-effect transistor).

That is, the active matrix substrate of the present embodiment is exemplified by the TFT substrate 10 in the foregoing description, but the present embodiment is not limited to this.

The present embodiment is exemplified by the case where the color filters 32 are provided on the counter substrate 30. However, the present embodiment is not limited to this. The color filters 32 of course can be provided on the TFT substrate 10 (i.e., the active matrix substrate) instead of the counter substrate 30.

The present embodiment is exemplified by the case where the pixel, which is a minimum constituent unit required for carrying out a color display is made up of three subpixels 4 of RGB. However, the present embodiment is not limited to this. The present embodiment can be applied to a display device which carries out a color display with colors in addition to or other than the three primary colors of RGB.

According to the present embodiment, the liquid crystal display device in which liquid crystal is used as a display medium is described as a display device. However, the present embodiment is not limited to this. The display medium can be a medium such as, for example, electroluminescence (EL), plasma, or an electrochromic element, provided that the medium is a display medium having an electro-optic property. The present invention can be applied to various display devices such as a liquid crystal display device, an EL display device, and an electrophoretic display device, in each of which a corresponding display medium is used.

Therefore, the active matrix substrate of the present embodiment and the display panel including the active matrix substrate can be used for an electronic apparatus including any of the above exemplified display devices as a display section. Such an electronic apparatus can be a device such as, for example, a mobile phone, a PDA (personal digital assistant), a DVD (digital versatile disk) player, portable game device, a laptop PC (personal computer), a PC screen, or a television receiver.

Note that the electronic apparatus of the present embodiment encompasses the display device itself. That is, the electronic apparatus of the present embodiment (i.e., the electronic apparatus including (i) the active matrix substrate of the present embodiment or (ii) the display panel including the active matrix substrate) can be a display device such as a liquid crystal display device or a device which includes the display device as a display section.

Embodiment 2

Figure 4:
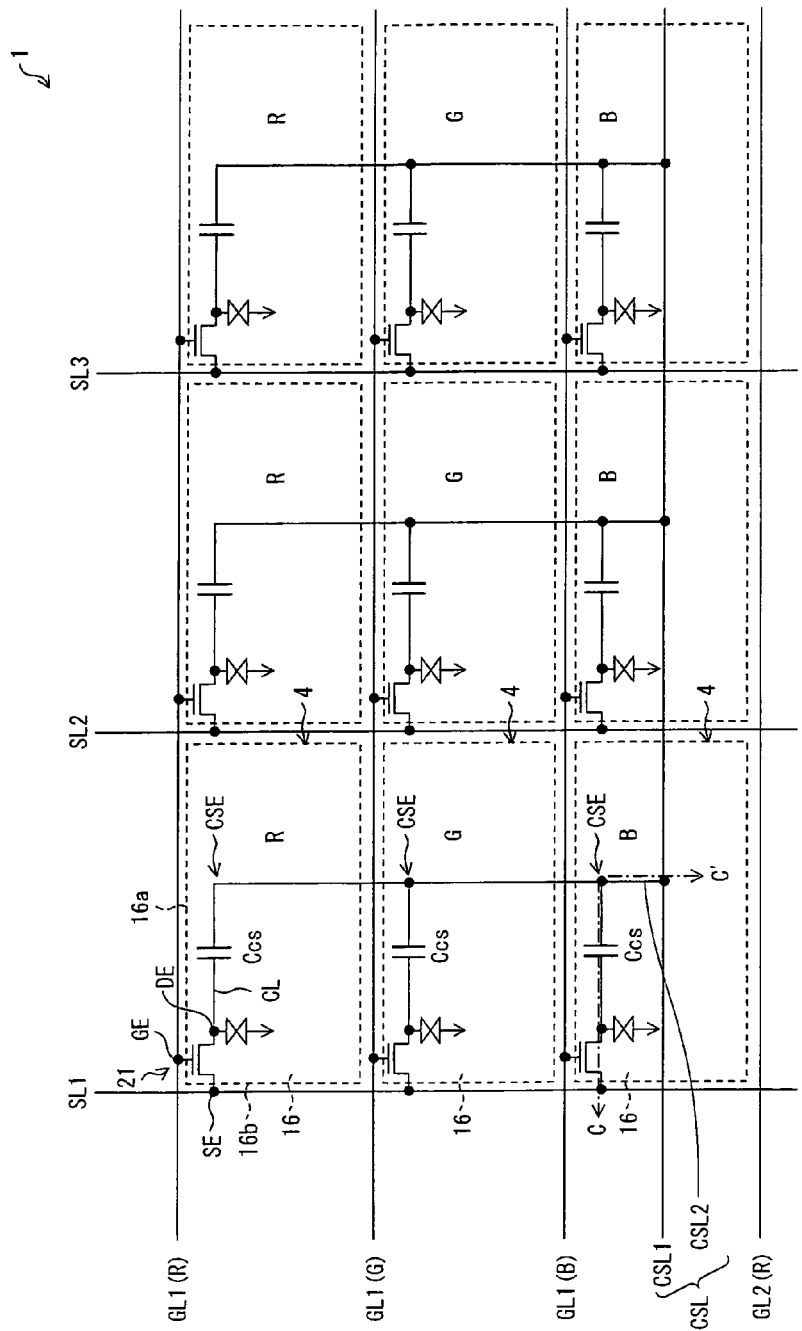
FIG. 4 is an equivalent circuit diagram of a liquid crystal panel included in a liquid crystal display device in Embodiment 2 of the present invention.
Figure 5:
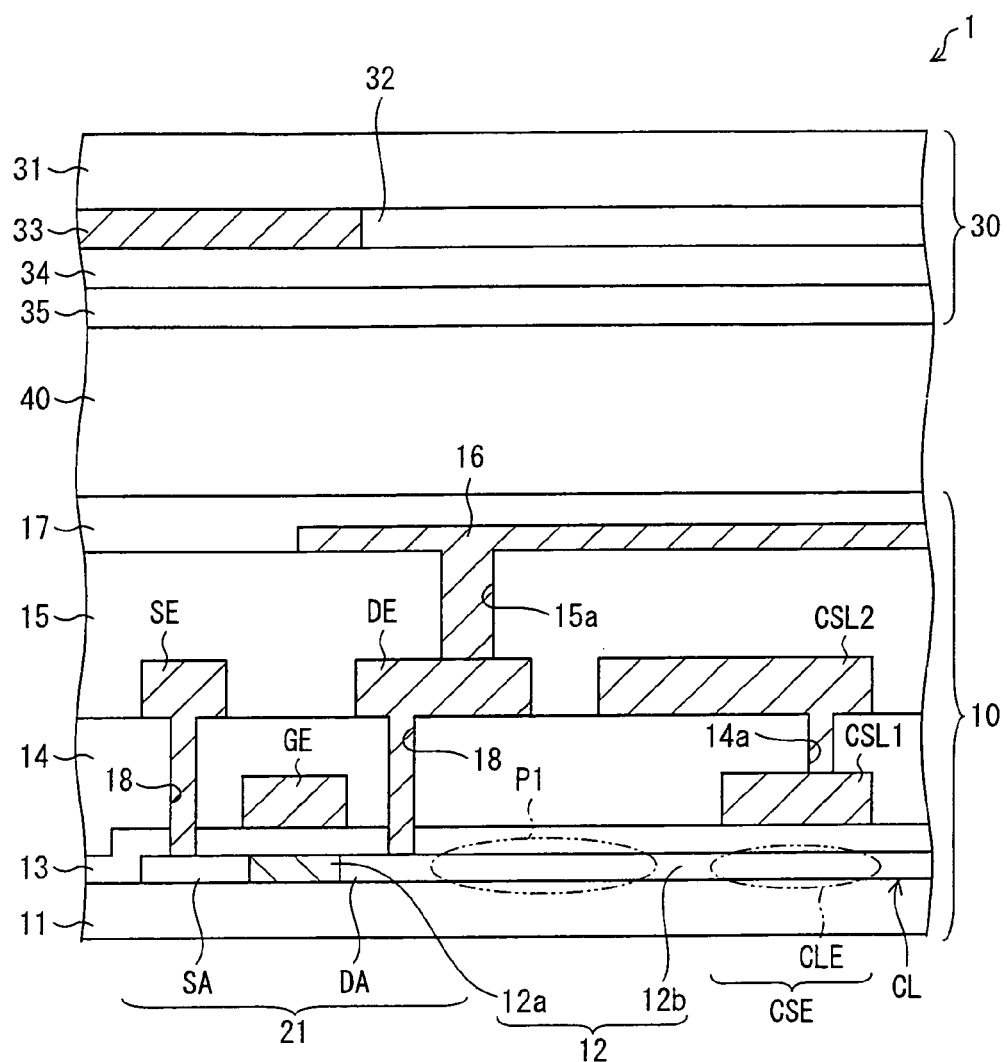
FIG. 5 is a cross-sectional view, which is taken by the line C-C' of FIG. 4, schematically illustrating main parts of the liquid crystal panel shown in FIG. 4.

The following describes another embodiment of the present invention with reference to FIGS. 4 and 5. Note that, in the present embodiment, only differences from Embodiment 1 are described. Further, same reference numerals are given to components which have functions identical to those in Embodiment 1 and descriptions regarding such components are omitted.

FIG. 4 is an equivalent circuit diagram illustrating a liquid crystal panel 1 included in the liquid crystal display device of the present embodiment. FIG. 5 is a cross-sectional view schematically illustrating a configuration of the liquid crystal panel 1 taken along the line C-C' in FIG. 4.

The liquid crystal panel 1 shown in FIG. 4 is identical to that of Embodiment 1 except that the storage capacitor line CSL has (i) a main line CSL1 (trunk line) which is provided so as to extend in the row direction and (ii) a branch line CSL2 which is branched off from the main line CSL1 and extends in the column direction.

The main line CSL1 is provided between adjacent two gate lines GL so as to extend in parallel with the gate lines GL. The branch line CSL2 is provided between adjacent two data lines SL so as to extend in parallel with the data lines SL.

According to the present embodiment also, as with Embodiment 1, a single storage capacitor line CSL is provided for each picture element as a single unit made up of three subpixels 4 of RGB. Moreover, the branch line CSL2 is provided so as to extend over a plurality of subpixels 4 which are adjacent to each other in a direction in which the data lines SL extend. Specifically, the branch line CSL2 is provided so as to extend from a first subpixel 4 (which is a blue subpixel 4 in the present embodiment), in which the main line CSL1 is provided, to adjacent subpixels 4 (which are red and green subpixels 4), (i) which are provided next to the first subpixel 4 and (ii) in which the main line CSL1 is not provided (see FIG. 4). Note that, according to the present embodiment, the adjacent subpixels 4 (i) which are provided next to the first subpixel 4 and (ii) in which the main line CSL1 is not provided are subpixels 4 which belong to a pixel to which the first subpixel 4 belongs.

According to the present embodiment also, the main line CSL1 of the storage capacitor line CSL is provided on a layer on which the gate electrode GE (gate line GL) is provided (see FIG. 5). The main line CSL1 and the gate electrode GE (gate line GL) can be formed in a single process.

The branch line CSL2 is provided on a layer on which, for example, the source electrode SE (data line SL) is provided (see FIG. 5). This makes it possible to form the branch line CSL2 and the source electrode SE (data line SL) in a single process.

The main line CSL1 and the branch line CSL2 are electrically connected with each other via a through-hole 14a which is formed in a first interlayer insulating film 14 provided between the main line CSL1 and the branch line CSL2. This makes it possible to form the storage capacitor line CSL which has the main line CSL1 extending in the row direction and the branch line CSL2 extending in the column direction from the main line CSL1.

As described above, according to the present embodiment, the number of the main lines CSL1 provided so as to extend in parallel with the gate lines GL is ⅓ of the number of the gate lines GL, and therefore the number of intersections of the storage capacitor lines CSL and the data lines SL is small. This causes capacitors respectively formed at intersections of the storage capacitor lines CSL and the data lines SL to be reduced, and therefore (i) the storage capacitor lines CSL are hardly affected by electric potential changes of the data lines SL and (ii) loads on the storage capacitor lines CSL are reduced. Accordingly, it is possible to obtain the liquid crystal display device which hardly causes a crosstalk. Moreover, it is possible to obtain the liquid crystal display device with small power consumption since the loads on the storage capacitor lines CSL and the data lines SL are reduced.

According to the present embodiment, the storage capacitor line CSL has the branch line CSL2 (see FIG. 4). This allows a length of wiring between each of the drain electrodes DE and the storage capacitor line CSL to be shortened. Accordingly, it is possible to provide the liquid crystal display device having a higher transmittance and excellent visibility. Further, resistance of the storage capacitor line CSL is drastically reduced, and thereby effects of electric potential changes of the data lines SL can be further reduced. This makes it possible to provide the liquid crystal display device which hardly causes a crosstalk and has further excellent display quality.

Embodiment 3

Figure 6:
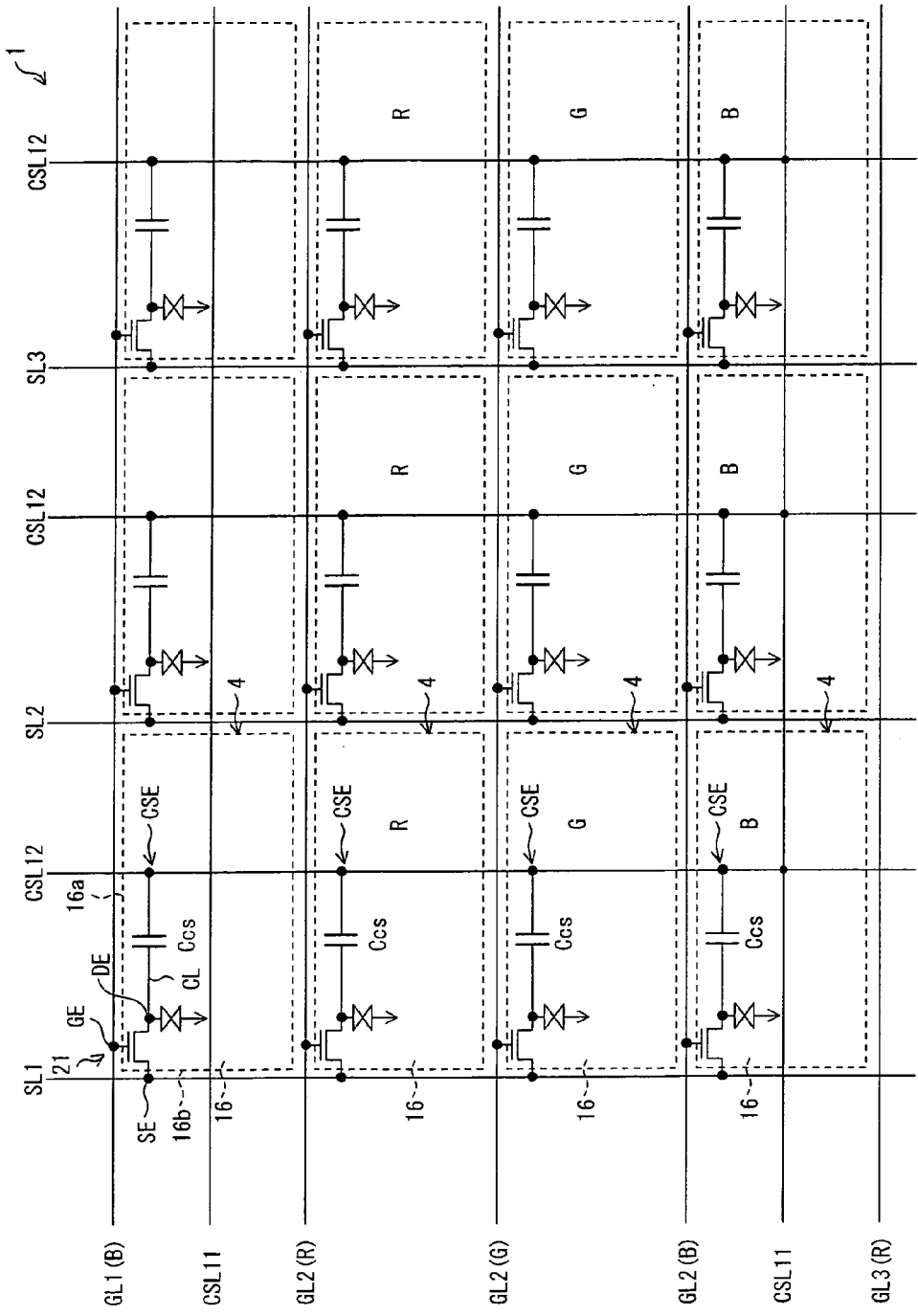
FIG. 6 is an equivalent circuit diagram of a liquid crystal panel included in a liquid crystal display device in Embodiment 3 of the present invention.

The following describes yet another embodiment of the present invention with reference to FIG. 6. Note that, in the present embodiment, only differences from Embodiments 1 and 2 are described. Further, same reference numerals are given to components which have functions identical to those in Embodiments 1 and 2 and descriptions regarding such components are omitted.

FIG. 6 is an equivalent circuit diagram illustrating a liquid crystal panel 1 included in a liquid crystal display device of the present embodiment.

The liquid crystal panel 1 shown in FIG. 6 has configurations identical to those of Embodiment 1, except that (i) the liquid crystal panel 1 shown in FIG. 6 includes storage capacitor lines CSL11 (lateral lines) provided so as to extend in the row direction and storage capacitor lines CSL12 (longitudinal lines) provided so as to extend in the column direction and (ii) the storage capacitor lines CSL11 and the storage capacitor lines CSL are provided in a matrix manner.

Each of the storage capacitor lines CSL11 is provided between adjacent two gate lines GL so as to extend in parallel with the gate lines GL. Moreover, each of the storage capacitor lines CSL12 is provided between adjacent two data lines SL so as to extend in parallel with the data lines SL.

According to the liquid crystal panel 1 of the present embodiment also, the storage capacitor lines CSL11, which are storage capacitor lines provided so as to extend in the row direction, are provided on a layer on which the gate electrodes GE (gate lines GL) are provided (not illustrated), as with the main line CSL1 of the liquid crystal panel 1 which is described in Embodiment 2 and shown in FIG. 5. The storage capacitor lines CSL11 and the gate electrodes GE (gate lines GL) can be formed in a single process.

The storage capacitor lines CSL12, which are storage capacitor lines provided so as to extend in the column direction, are provided on a layer on which, for example, the source electrodes SE (data lines SL) are provided, as with the branch line CSL2 of the liquid crystal panel 1 described in Embodiment 2 and shown in FIG. 5. The storage capacitor lines CSL12 and the source electrodes SE (data lines SL) can be formed in a single process.

The storage capacitor lines CSL11 and the storage capacitor lines CSL12 are electrically connected with each other via a through-hole 14a formed in a first interlayer insulating film 14 which is provided between the storage capacitor lines CSL11 and the storage capacitor lines CSL12. This makes it possible to form the storage capacitor lines CSL11 and CSL12 which are arranged in a matrix manner as shown in FIG. 6.

According to the present embodiment, as with Embodiments 1 and 2, the number of the storage capacitor lines CSL11 provided so as to extend in parallel with the gate lines GL is ⅓ of the number of the gate lines GL, and therefore the number of intersections of the storage capacitor lines CSL11 and the data lines SL is small. This causes capacitors respectively formed at intersections of the storage capacitor lines CSL11 and the data lines SL to be reduced, and therefore (i) the storage capacitor lines CSL11 and CSL12 are hardly affected by electric potential changes of the data lines SL and (ii) loads on the storage capacitor lines CSL11 and CSL12 are reduced. Accordingly, it is possible to obtain the liquid crystal display device which hardly causes a crosstalk. Moreover, it is possible to obtain the liquid crystal display device with small power consumption since the loads on the storage capacitor lines CSL11 and CSL12 and the data lines SL are reduced.

According to the present embodiment, the storage capacitor lines CSL11 and CSL12 are arranged in a matrix manner. This allows a length of wiring between the drain electrode DE and the storage capacitor lines CSL11 and CSL12 to be shortened (see FIG. 6). Accordingly, it is possible to provide the liquid crystal display device having a higher transmittance and excellent visibility. Further, resistance of the storage capacitor lines CSL11 and CSL12 is drastically reduced, and thereby effects of electric potential changes of the data lines SL can be further reduced. This makes it possible to provide the liquid crystal display device which hardly causes a crosstalk and has further excellent display quality.

Embodiment 4

Figure 7:
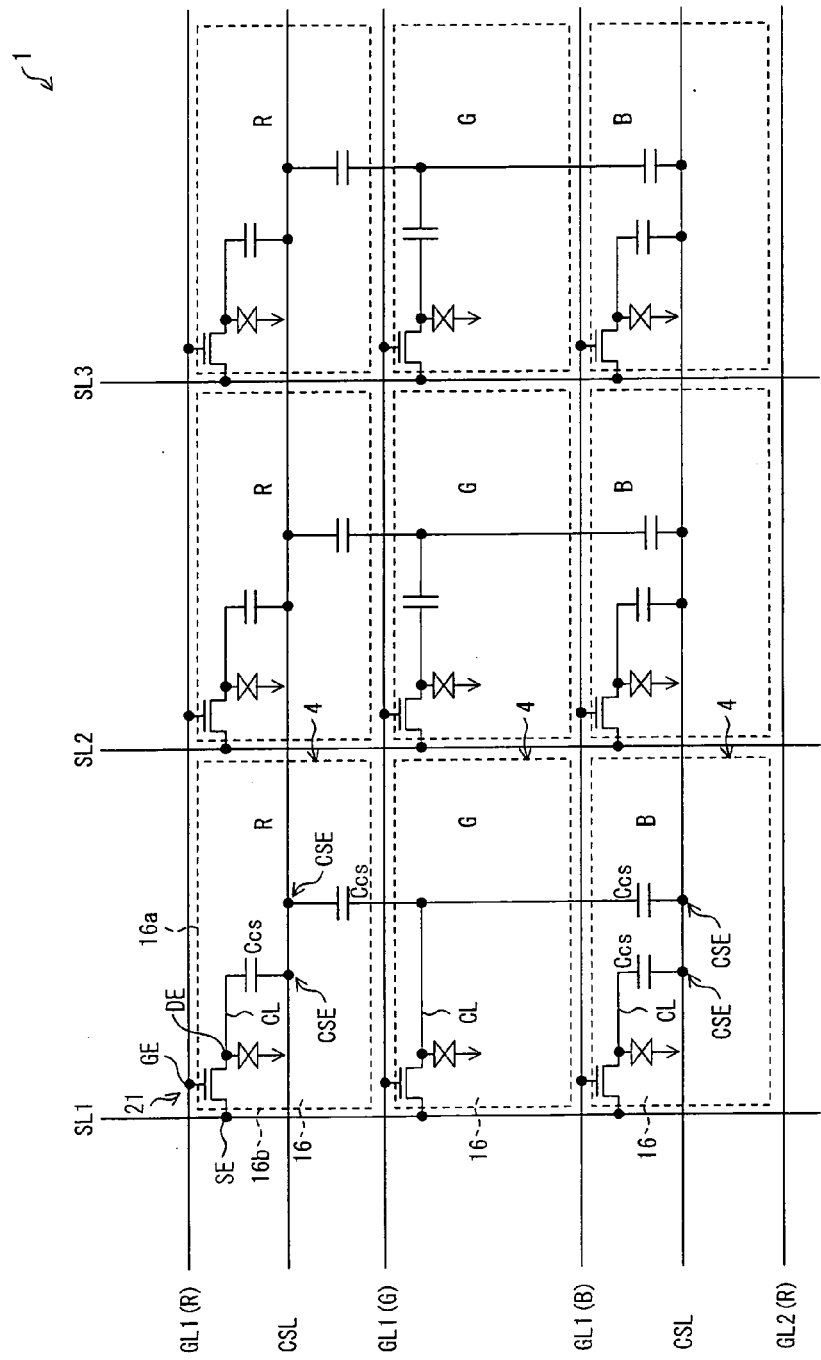
FIG. 7 is an equivalent circuit diagram of a liquid crystal panel included in a liquid crystal display device in Embodiment 4 of the present invention.
Figure 8:
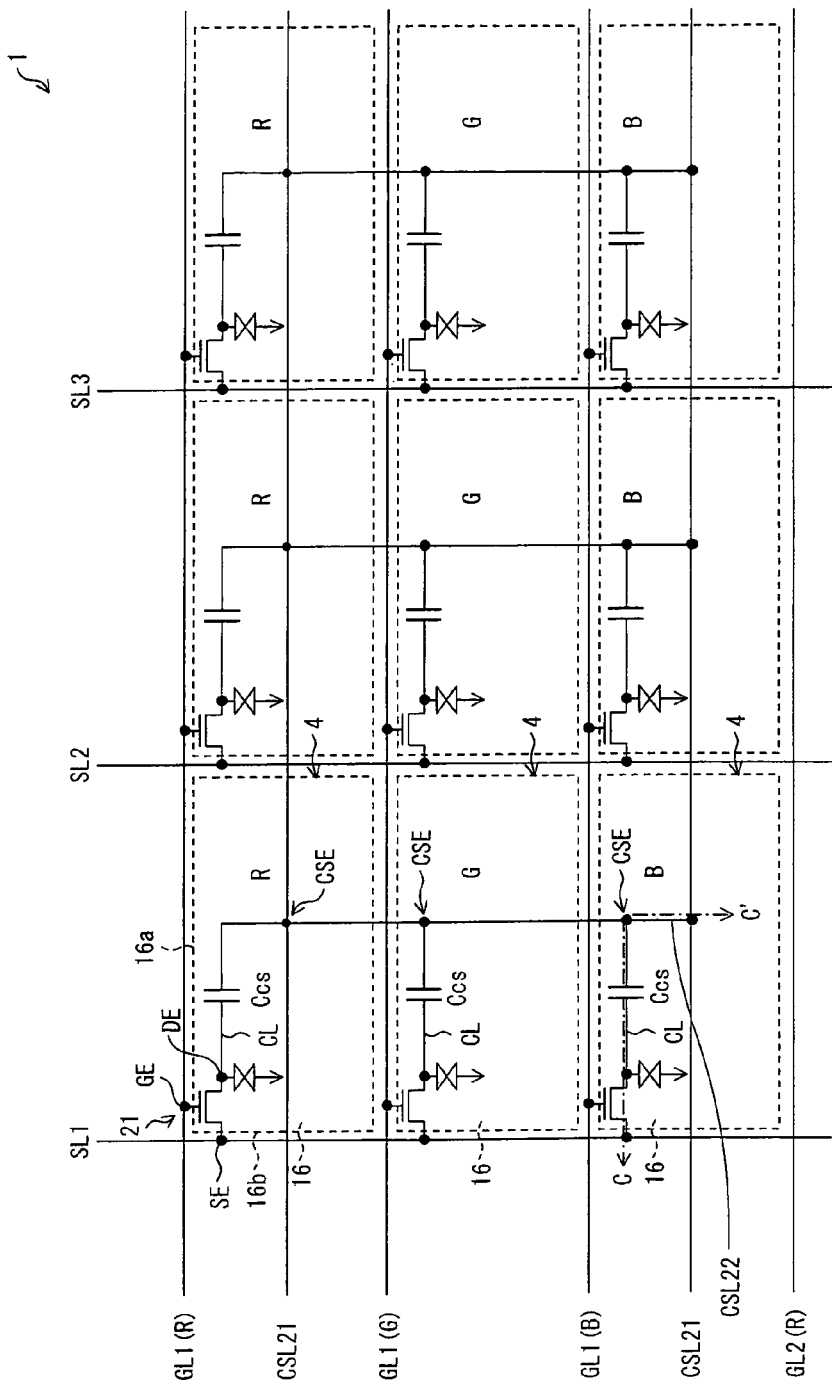
FIG. 8 is an equivalent circuit diagram of another liquid crystal panel included in a liquid crystal display device in Embodiment 4 of the present invention.

The following describes yet another embodiment of the present invention with reference to FIGS. 7 and 8. Note that, in the present embodiment, only differences from Embodiments 1 through 3 are described. Further, same reference numerals are given to components which have functions identical to those in Embodiments 1 through 3 and descriptions regarding such components are omitted.

According to Embodiments 1 through 3, a single storage capacitor line provided so as to extend in the row direction is provided for every three subpixels 4. In the present embodiment, two storage capacitor lines provided so as to extend in the row direction are provided for every three subpixels 4.

FIGS. 7 and 8 are equivalent circuit diagrams each of which illustrates a liquid crystal panel 1 included in a liquid crystal display device of the present embodiment.

The liquid crystal panel 1 shown in FIG. 7 includes, in each pixel, two storage capacitor lines CSL which extend in the row direction. A connection line CL is provided so as to extend in the column direction and overlaps at least one of the storage capacitor lines CSL.

According to the present embodiment, the two storage capacitor lines CSL are respectively provided for red and blue subpixels 4. The red and blue subpixels 4 are provided with respective TFTs 21. Drain electrodes DE of the respective TFTs 21 are electrically connected with respective connection lines CL which overlap the respective two storage capacitor lines CSL so as to form storage capacitors Ccs. On the other hand, a green subpixel 4 is provided with a TFT 21 which has a drain electrode DE electrically connected with a connection line CL. The connection line CL and the two storage capacitor lines CSL respectively provided in the red and blue subpixels 4 form storage capacitors Ccs.

The liquid crystal panel 1 shown in FIG. 8 includes (i) two storage capacitor lines CSL21 (main lines), which extend in the row direction, in each pixel and (ii) a branch line CSL22 which is branched off from the storage capacitor lines CSL21 and extends in the column direction so as to connect the storage capacitor lines CSL21 with each other. The liquid crystal panel 1 shown in FIG. 8 has a configuration identical to that of the liquid crystal panel 1 shown in FIG. 5, except that the liquid crystal panel 1 shown in FIG. 8 includes, in each pixel, two storage capacitor lines CSL21 which are provided so as to extend in the row direction. The storage capacitor lines CSL21 are respectively provided in the red and blue subpixels 4 (see FIG. 8).

Figure 9:
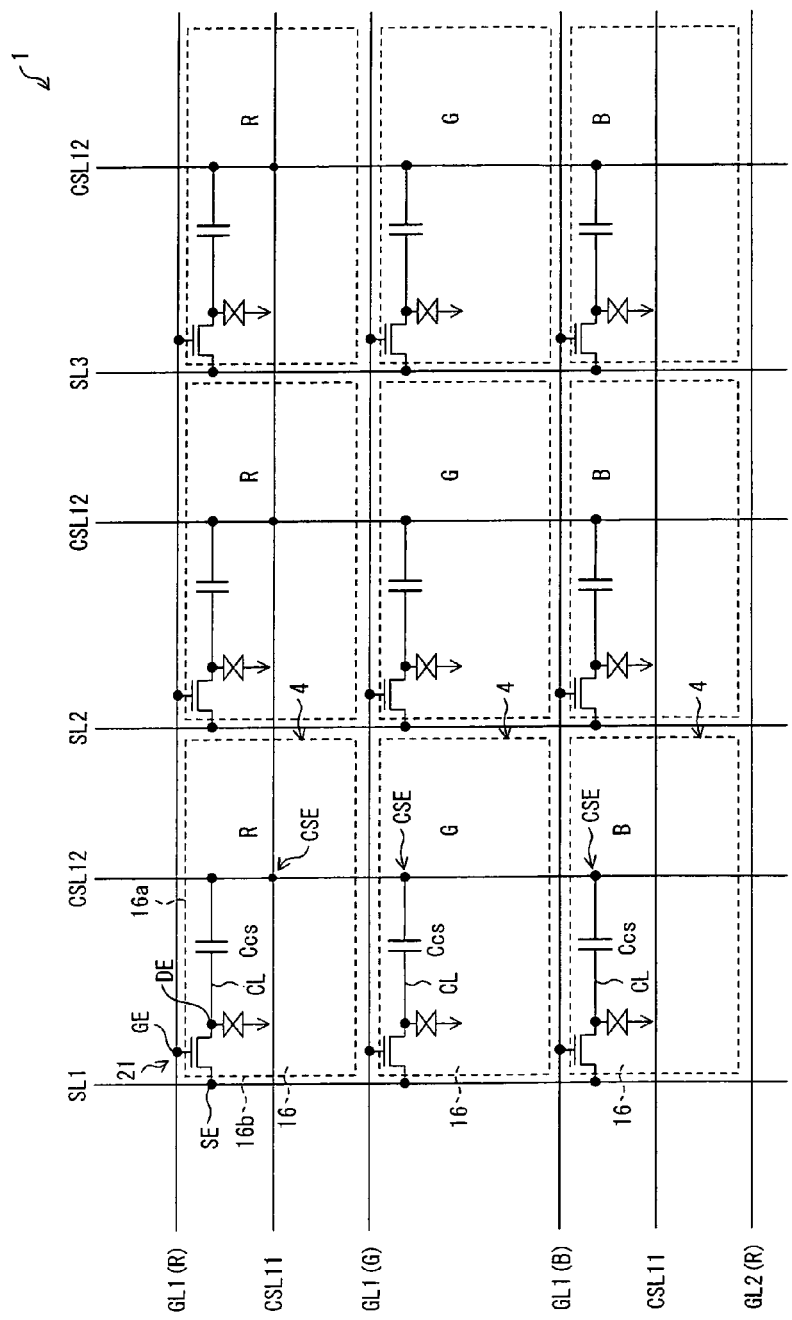
FIG. 9 is an equivalent circuit diagram of yet another liquid crystal panel included in a liquid crystal display device in Embodiment 4 of the present invention.
Figure 10:
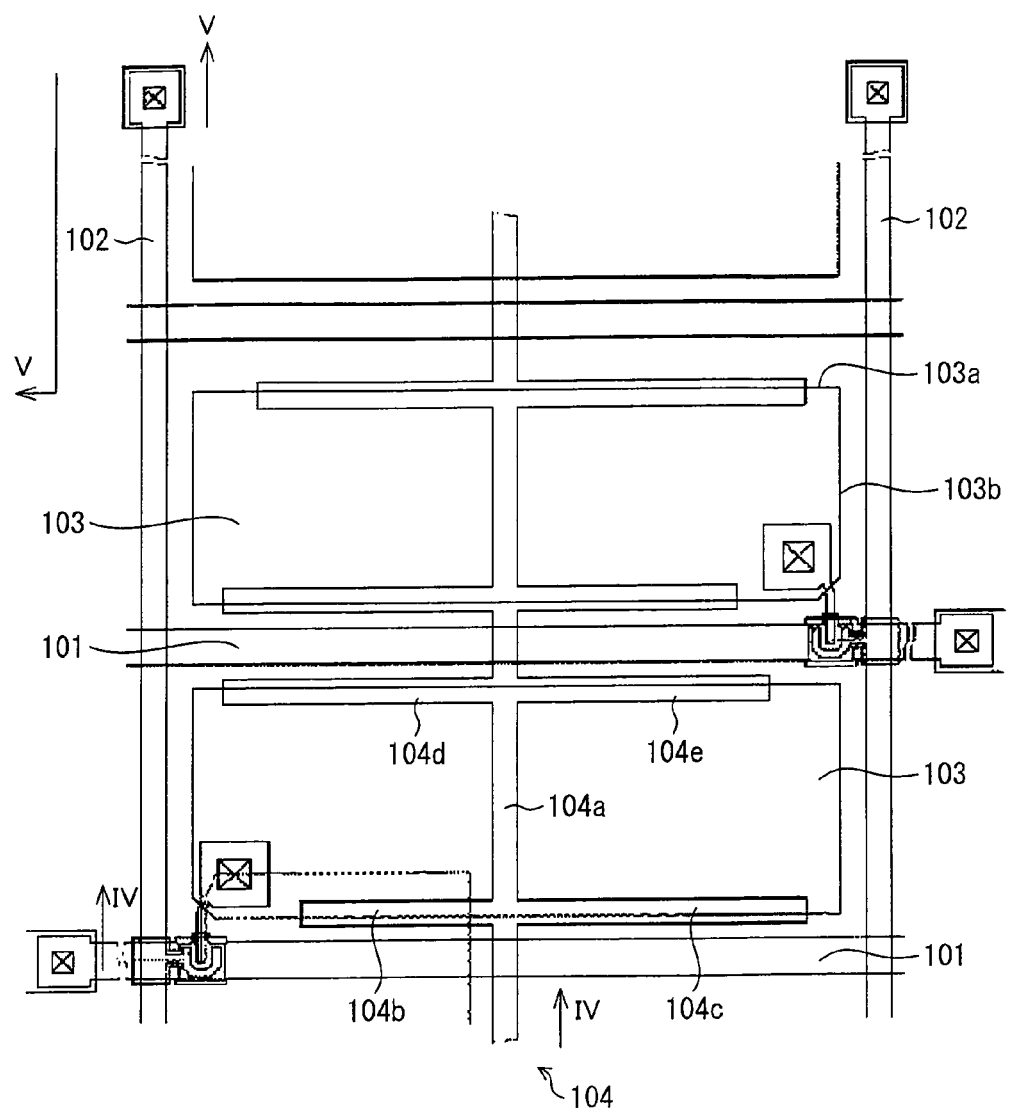
FIG. 10 is a plan view schematically illustrating main parts of a liquid crystal display device disclosed in Patent Literature 1.
Figure 11:
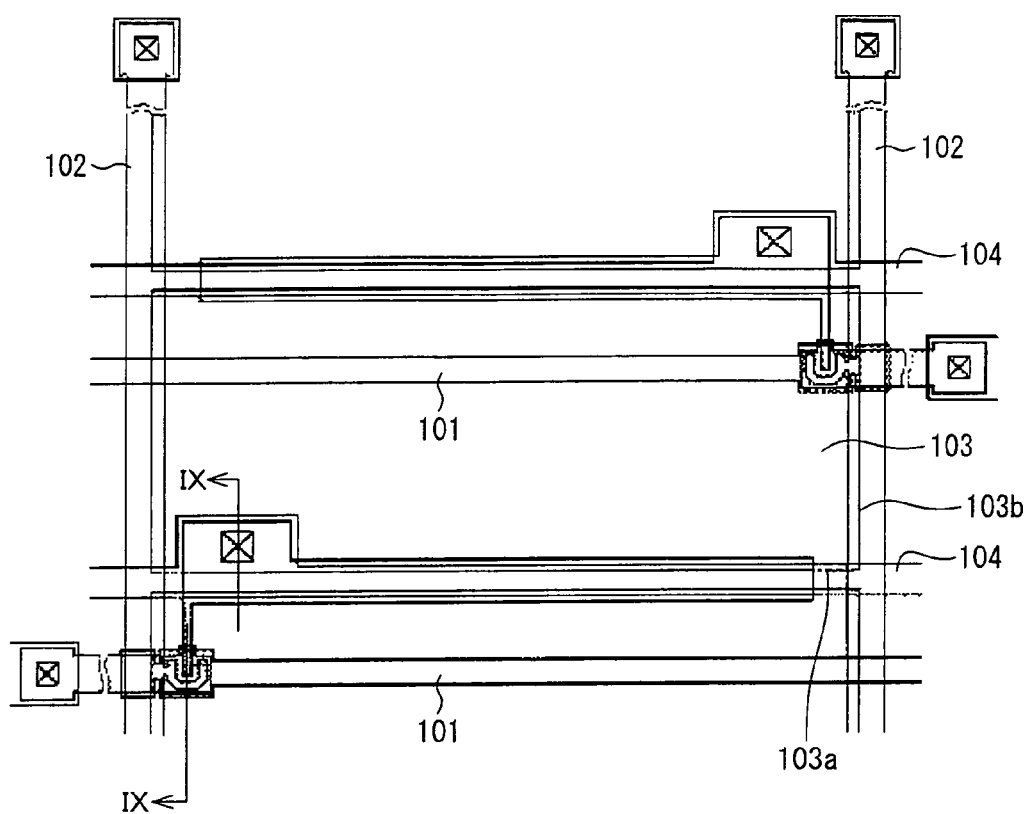
FIG. 11 is a plan view schematically illustrating main parts of another liquid crystal display device disclosed in Patent Literature 1.
Figure 12:
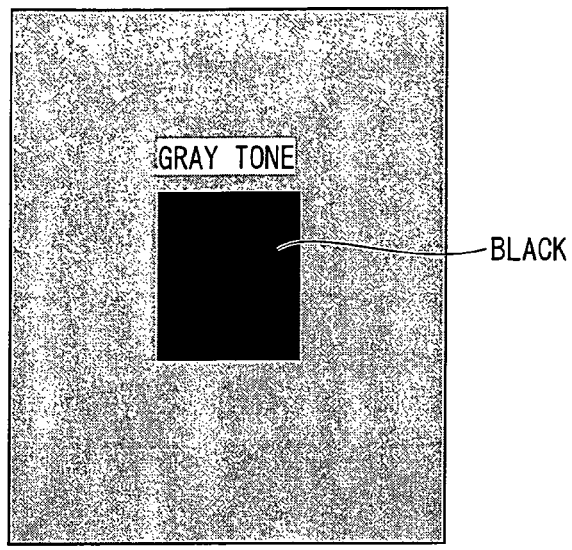
FIG. 12 is a schematic view for explaining a conventional crosstalk phenomenon: (a) is a view schematically illustrating a proper video picture to be displayed; and (b) is a view schematically illustrating a video picture which is to be actually displayed.
Figure 12:
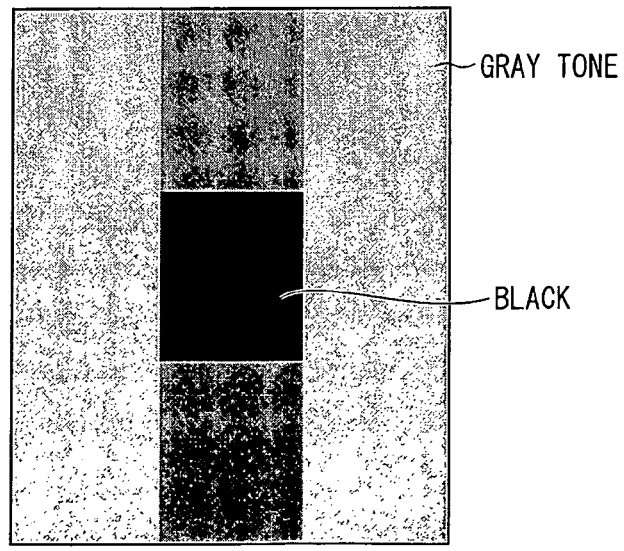

The liquid crystal panel 1 shown in FIG. 9 includes storage capacitor lines CSL11 (horizontal lines) provided so as to extend in the row direction and storage capacitor lines CSL12 (vertical lines) provided so as to extend in the column direction, as with the liquid crystal panel 1 which is described in Embodiment 3 and shown in FIG. 6. The storage capacitor lines CSL11 and the storage capacitor lines CSL12 are provided in a matrix manner. The liquid crystal panel 1 shown in FIG. 9 has a configuration identical to that of the liquid crystal panel 1 shown in FIG. 6, except that the liquid crystal panel 1 shown in FIG. 9 includes the two storage capacitor lines CSL11 which are provided in each pixel so as to extend in the row direction. The storage capacitor lines CSL11 are respectively provided in the red and blue subpixels 4 (see FIG. 9).

Each of the liquid crystal panels 1 shown in FIGS. 7 through 9 can be prepared with a production method similar to that for a liquid crystal panel 1 described in any of Embodiments 1 through 3. That is, each of the liquid crystal panels 1 shown in FIGS. 7 through 9 can be prepared by only changing a layout of wiring in a production methods for a corresponding liquid crystal panels 1 described in any of Embodiments 1 through 3.

According to the liquid crystal panel 1 of the present embodiment, the number of the storage capacitor lines provided so as to extend in parallel with the gate lines GL is ⅔ of the number of the gate lines GL (see FIGS. 7 through 9). Accordingly, it is possible to reduce the number of intersections of the storage capacitor lines and the data lines SL, also in the present embodiment. This causes, also in the present embodiment, capacitors respectively formed at intersections of the storage capacitor lines and the data lines SL to be reduced, and therefore (i) the storage capacitor lines are hardly affected by electric potential changes of the data lines SL and (ii) loads on the storage capacitor lines are reduced. Accordingly, it is possible to obtain the liquid crystal display device which hardly causes a crosstalk. Moreover, it is possible to obtain the liquid crystal display device with small power consumption since the loads on the storage capacitor lines and the data lines SL are reduced.

According to the present embodiment also, a length of wiring between the drain electrode and the storage capacitor line can be shortened, as with the liquid crystal panel 1 described in Embodiments 2 and 3. Accordingly, it is possible to provide the liquid crystal display device having a higher transmittance and excellent visibility. Further, resistance of the storage capacitor lines is drastically reduced, and thereby effects of electric potential changes of the data lines SL can be further reduced. This makes it possible to provide the liquid crystal display device which hardly causes a crosstalk and has further excellent display quality.

As described above, the present invention is not limited to the case where the number of the storage capacitor lines CSL extending in parallel with the gate lines GL is ⅓ of the number of the gate lines GL (that is, a single storage capacitor line CSL is provided for a pixel which is a minimum constituent unit required for carrying out a color display). Specifically, it is sufficient as long as the number of the storage capacitor lines CSL extending in parallel with the gate line GL is smaller than that of the gate lines GL.

However, in a case where storage capacitor lines CSL are provided by a unit such as ½, ¼, or ⅕, it is necessary to cause pitches of repetitive pixels to be uneven so that aperture ratios of respective pixels, each of which is the minimum constituent unit, are set to be uniform. Moreover, in a case where a length of wiring between the drain electrode and the storage capacitor line is too long, transmittance and visibility are decreased, and a load is applied to a resistor of the storage capacitor line. Therefore, it is preferable that the number of the storage capacitor lines CSL is one (1) for two pixels each of which is the minimum constituent unit for carrying out a color display, as described above. Alternatively, it is preferable that the number is one (1) or two for each pixel which is the minimum constituent unit for carrying out a color display. As described in Embodiment 1, it is more preferable, in view of the aperture ratio, that one (1) or two of the storage capacitor line(s) CSL is(are) provided for each pixel, which is the minimum constituent unit for carrying out a color display.

The present invention is not limited to the embodiments, but can be altered by a skilled person in the art within the scope of the claims. An embodiment derived from a proper combination of technical means disclosed in respective different embodiments is also encompassed in the technical scope of the present invention.

INDUSTRIAL APPLICABILITY

The active matrix substrate of the present invention and the display panel including the active matrix substrate can be suitably used for (i) a display device such as a liquid crystal display device and (ii) an electronic apparatus such as a mobile phone, a PDA, a DVD player, a portable game device, a laptop PC, a PC screen, or a television receiver, which includes the display device.

REFERENCE SIGNS LIST

1: Liquid crystal panel
2: Source driver
3: Gate driver
4: Subpixel
10: TFT substrate (active matrix substrate)
11: Transparent substrate
12: Semiconductor layer
12a: Channel area
12b: Impurity-introduced area
13: Gate insulating film
14: First interlayer insulating film
14a: Through-hole
15: Second interlayer insulating film
15a: Contact hole
16: Pixel electrode
17: Alignment film
18: Contact hole
21: TFT (transistor)
30: Counter substrate
31: Transparent substrate
32: Color filter
33: Black matrix
34: Counter electrode
35: Alignment film
40: Liquid crystal layer
P1: Area
P2: Area
P3: Area
CL: Connection line
CLE: Electrode
CSE: Storage capacitor element
CSL: Storage capacitor line
CSL1: Main line
CSL2: Branch line CSL11: Storage capacitor line
CSL12: Storage capacitor line
CSL21: Storage capacitor line
CSL22: Branch line
CSLE: Electrode
DA: Drain area
SA: Source area
DE: Drain electrode
GE: Gate electrode
SE: Source electrode
GL: Gate line
SL: Data line

The invention claimed is:

1. An active matrix substrate comprising:
a plurality of gate lines and a plurality of data lines arranged in a matrix manner:
a plurality of pixel electrodes each of which has a first side and a second side, the first side extending in parallel with the plurality of gate lines, the second side extending in parallel with the plurality of data lines and being shorter than the first side;
a plurality of storage capacitor lines which are arranged in parallel with the plurality of gate lines; and
a plurality of connection lines which are electrically connected with respective of the plurality of pixel electrodes, part of each of the plurality of connection lines overlapping part of each of the plurality of storage capacitor lines via an insulating film so as to form a storage capacitor element, wherein
the part of the plurality of storage capacitor lines and the part of each of the plurality of connection lines serve as respective electrodes of the storage capacitor element,
the number of the plurality of storage capacitor lines is smaller than that of the plurality of gate lines,
each of the plurality of storage capacitor lines overlap some of the plurality of connection lines via the insulating film, the some of the plurality of connection lines are respectively electrically connected with corresponding ones of the plurality of pixel electrodes which are arranged along the plurality of data lines,
one of the electrodes included in the storage capacitor element is disposed at least partially on a layer on which a semiconductor layer of each of a plurality of transistors is disposed, the plurality of transistors being provided for respective ones of the plurality of pixel electrodes,
the plurality of connection lines are electrically connected with respective drain electrodes of the plurality of transistors which are provided for respective ones of the plurality of pixel electrodes arranged along the plurality of data lines, and
a wiring between each of the drain electrodes and the storage capacitor element is at least partially disposed on a layer on which the semiconductor layer is disposed.

2. The active matrix substrate as set forth in claim 1, wherein:
each of the plurality of gate lines is provided between the plurality of pixel electrodes; and
the plurality of storage capacitor lines and the plurality of pixel electrodes overlap each other via the insulating film.

3. The active matrix substrate as set forth in claim 1, wherein:
a single one of the plurality of storage capacitor lines is provided per pixel which is a minimum constituent unit required for carrying out a color display with a display panel provided with the active matrix substrate.

4. The active matrix substrate as set forth in claim 1, wherein:
each of the plurality of storage capacitor lines is at least partially disposed in a subpixel of a particular display color for carrying out a color display with a display panel provided with the active matrix substrate.

5. The active matrix substrate as set forth in claim 4, wherein:
each of the plurality of storage capacitor lines is at least partially disposed in a blue subpixel.

6. The active matrix substrate as set forth in claim 1, wherein:
the plurality of storage capacitor lines are disposed on a layer on which the plurality of gate lines are disposed.

7. The active matrix substrate as set forth in claim 1, wherein:
part of the wiring between each of the drain electrodes and the storage capacitor element which part overlaps a corresponding one of the plurality of gate lines is made up of a semiconductor layer in which an impurity is introduced.

8. The active matrix substrate as set forth in claim 1 wherein:
the plurality of storage capacitor lines have a branch line in addition to a main line, the main line extending in parallel with the plurality of gate lines, and the branch line branching off from the main line and extending in parallel with the plurality of data lines.

9. A display panel comprising:
an active matrix substrate recited in claim 1;
a counter substrate which faces the active matrix substrate; and
a display medium layer which is provided between the active matrix substrate and the counter substrate.

10. The display panel as set forth in claim 9, wherein the display medium layer is a liquid crystal layer.

11. A display device comprising a display panel recited in claim 9.

12. An electronic apparatus comprising a display panel recited in claim 9.

13. An active matrix substrate comprising:
a plurality of gate lines and a plurality of data lines arranged in a matrix manner:
a plurality of pixel electrodes each of which has a first side and a second side, the first side extending in parallel with the plurality of gate lines, the second side extending in parallel with the plurality of data lines and being shorter than the first side;
a plurality of storage capacitor lines which are arranged in parallel with the plurality of gate lines;
another plurality of storage capacitor lines arranged in parallel with the plurality of data lines, the plurality of storage capacitor lines and the another plurality of storage capacitor lines being arranged in a matrix manner; and
a plurality of connection lines which are electrically connected with respective of the plurality of pixel electrodes, part of each of the plurality of connection lines overlapping part of each of the plurality of storage capacitor lines via an insulating film so as to form a storage capacitor element, wherein
the part of the plurality of storage capacitor lines and the part of each of the plurality of connection lines serve as respective electrodes of the storage capacitor element, the number of the plurality of storage capacitor lines is smaller than that of the plurality of gate lines, and each of the plurality of storage capacitor lines overlap some of the plurality of connection lines via the insulating film, the some of the plurality of connection lines are respectively electrically connected with corresponding ones of the plurality of pixel electrodes which are arranged along the plurality of data lines.

14. A display panel comprising:

an active matrix substrate as recited in claim 13;

a counter substrate which faces the active matrix substrate; and a display medium layer which is provided between the active matrix substrate and the counter substrate.

15. The display panel as set forth in claim 14, wherein the display medium layer is a liquid crystal layer.

16. A display device comprising:

a display panel as recited in claim 14.

17. An electronic apparatus comprising:

a display panel as recited in claim 14.

* * * * *